United States Patent
Li

(10) Patent No.: US 9,530,214 B2
(45) Date of Patent: Dec. 27, 2016

(54) IMAGE PROCESSING SYSTEM WITH DEPTH MAP DETERMINATION BASED ON ITERATION COUNT OF BLUR DIFFERENCE AND METHOD OF OPERATION THEREOF

(71) Applicant: Sony Corporation, Tokyo (JP)

(72) Inventor: Pingshan Li, Sunnyvale, CA (US)

(73) Assignee: Sony Corporation, Tokyo (JP)

(*) Notice: Subject to any disclaimer, the term of this patent is extended or adjusted under 35 U.S.C. 154(b) by 132 days.

(21) Appl. No.: 14/560,978

(22) Filed: Dec. 4, 2014

(65) Prior Publication Data

US 2016/0163055 A1   Jun. 9, 2016

(51) Int. Cl.
*G06T 7/00* (2006.01)
*G06T 15/00* (2011.01)
*H04N 13/00* (2006.01)

(52) U.S. Cl.
CPC ............ *G06T 7/0069* (2013.01); *G06T 15/00* (2013.01); *H04N 13/0037* (2013.01); *H04N 13/0066* (2013.01); *G06T 2207/10148* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 7,711,201 B2 | 5/2010 | Wong et al. | |
| 8,027,582 B2 | 9/2011 | Li | |
| 8,194,995 B2 | 6/2012 | Wong et al. | |
| 8,280,194 B2 | 10/2012 | Wong et al. | |
| 8,335,390 B2 | 12/2012 | Li et al. | |
| 8,542,268 B2 | 9/2013 | Pavani et al. | |
| 8,553,093 B2 | 10/2013 | Wong et al. | |
| 8,624,986 B2 | 1/2014 | Li | |
| 8,736,747 B2 | 5/2014 | Li | |

(Continued)

FOREIGN PATENT DOCUMENTS

EP   2 378 760 A2   10/2011

OTHER PUBLICATIONS

Kosloff et al., "An Algorithm for Rendering Generalized Depth of Field Effects Based on Simulated Heat Diffusion", Jan. 24, 2007, pp. 1124-11410, vol. 4707, Intl. Conf. on Computational Science and Its Applications (Eds.), Berlin, Heidelberg.

(Continued)

*Primary Examiner* — Said Broome
(74) *Attorney, Agent, or Firm* — Haverstock & Owens LLP

(57) ABSTRACT

A system and method of operation of an image processing system includes: a receive images module for receiving a first image having a first aperture and a second image having a second aperture with the first image and the second image each having a red channel and a green channel; a calculate blur difference module for calculating a red iteration count of a blur difference for the red channel of the first image and the second image, and calculating a green iteration count of the blur difference for the green channel of the first image and the second image; a calculate depth map module for forming a depth map having an element depth based on the red iteration count and the green iteration count; and a calculate display image module for forming a display image based on the first image and the depth map for displaying on a display device.

20 Claims, 11 Drawing Sheets

(56) References Cited

U.S. PATENT DOCUMENTS

| | | |
|---|---|---|
| 2006/0092314 A1 | 5/2006 | Silverstein et al. |
| 2006/0093234 A1 | 5/2006 | Silverstein |
| 2008/0247670 A1* | 10/2008 | Tam .................... G06T 7/0051 |
| | | 382/298 |
| 2009/0268985 A1 | 10/2009 | Wong et al. |
| 2013/0142394 A1 | 6/2013 | Li et al. |
| 2013/0258096 A1 | 10/2013 | Ali et al. |

OTHER PUBLICATIONS

Perwass et al., "Single Lens 3D-Camera with Extended Depth-of-Field", 15 pages, Raytrix GmbH, Kiel, Germany, retrieved on May 12, 2014 Raytrix website.

Wustner et al., "Chromatic Aberration Correction and Deconvolution for UV Sensitive Imaging of Fluorescent Sterols in Cytoplasmic Lipid Droplets", "ISAC, Cytometry Part A—74A: pp. 727-744, 3D-Analysis of Fluorescent Sterol Distribution", 2008, Wiley InterScience, retrieved on May 16, 2014 from Wiley InterScience online library/website.

Extended Searmr Report from EP Application No. 151197361.7.

* cited by examiner

IMAGE PROCESSING SYSTEM WITH DEPTH MAP DETERMINATION BASED ON ITERATION COUNT OF BLUR DIFFERENCE AND METHOD OF OPERATION THEREOF

TECHNICAL FIELD

The present invention relates generally to an image processing system, and more particularly to an image processing system with aperture change depth estimation.

BACKGROUND ART

Modern consumer and industrial electronics, especially devices with a graphical imaging capability, such as cameras, televisions, projectors, cellular phones, and combination devices, are providing increasing levels of functionality to support modern life including three-dimensional display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to display three-dimensional images on consumer, industrial, and mobile electronics such as video projectors, televisions, monitors, smart phones, gaming systems, cameras, or a personal digital assistant (PDA).

Three-dimensional image processing systems have been incorporated in cameras, projectors, televisions, notebooks, and other portable products. Today, these systems aid users by capturing and displaying available relevant information, such as diagrams, maps, or videos. The display of three-dimensional images provides invaluable relevant information. Three dimensional images can be formed by capturing stereoscopic images with multiple lenses.

However, displaying information in three-dimensional form has become a paramount concern for the consumer. Displaying a three-dimensional image that does not correlates with the real world decreases the benefit of using the tool.

Thus, a need still remains for better image processing system to capture and display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Depth estimation can also be used for applications such as auto focus, gaming, or other similar applications.

Solutions to these problems have been long sought but prior developments have not taught or suggested any solutions and, thus, solutions to these problems have long eluded those skilled in the art.

DISCLOSURE OF THE INVENTION

The present invention provides a method of operation of an image processing system including: receiving a first image having a first aperture and a second image having a second aperture with the first image and the second image each having a red channel and a green channel; calculating a red iteration count of a blur difference for the red channel of corresponding portions of the first image and the second image; calculating a green iteration count of the blur difference for the green channel of corresponding portions of the first image and the second image; forming a depth map having an element depth based on the red iteration count and the green iteration count; and forming a display image based on the first image and the depth map for displaying on a display device.

The present invention provides an image processing system including: a receive images module for receiving a first image having a first aperture and a second image having a second aperture with the first image and the second image each having a red channel and a green channel; a calculate blur difference module, coupled to the receive images module, for calculating a red iteration count of a blur difference for the red channel of corresponding portions of the first image and the second image, and calculating a green iteration count of the blur difference for the green channel of corresponding portions of the first image and the second image; a calculate depth map module, coupled to the calculate blur difference module for forming a depth map having an element depth based on the red iteration count and the green iteration count; and a calculate display image module, coupled to the calculate depth map module, for forming a display image based on the first image and the depth map for displaying on a display device.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 10A is a first example of the depth map.

FIG. 10B is a second example of the depth map.

BEST MODE FOR CARRYING OUT THE INVENTION

Figure 1:
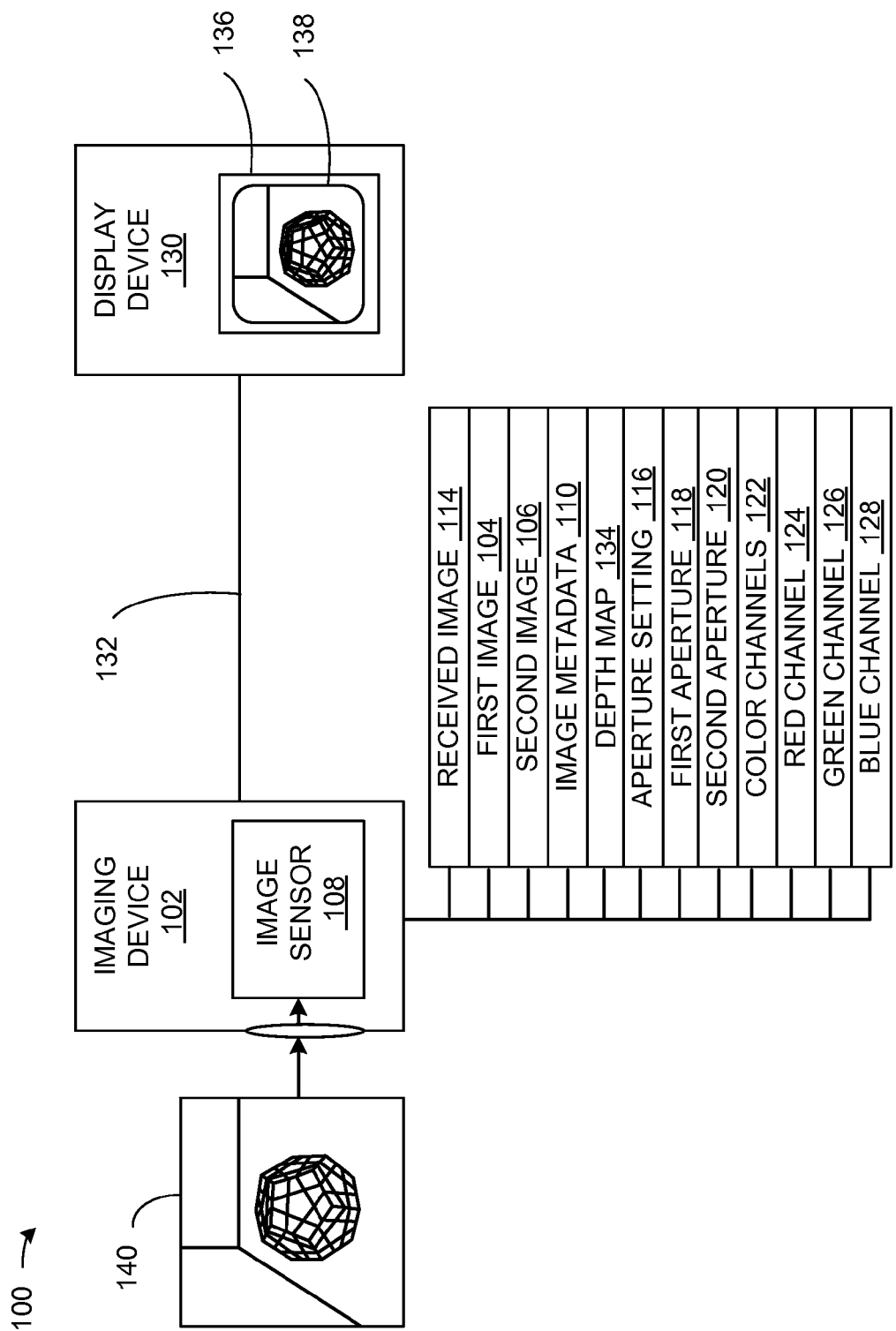
FIG. 1 is an image processing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGS. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "image" is defined as a pictorial representation of an object. An image can include a two-dimensional image, three-dimensional image, video frame, a calculated file representation, an image from a camera, a video frame, or a combination thereof. For example, the image can be a machine readable digital file, a physical photograph, a digital photograph, a motion picture frame, a video frame, an x-ray image, a scanned image, or a combination thereof. The image can be formed by pixels arranged in a rectangular array. The image can include an x-axis along the direction of the rows and a y-axis along the direction of the columns.

The horizontal direction is the direction parallel to the x-axis of an image. The vertical direction is the direction parallel to the y-axis of an image. The diagonal direction is the direction non-parallel to the x-axis and non-parallel to the y-axis.

The term "module" referred to herein can include software, hardware, or a combination thereof. For example, the software can be machine code, firmware, embedded code, and application software. Also for example, the hardware can be circuitry, processor, calculator, integrated circuit, integrated circuit cores, or a combination thereof.

Referring now to FIG. 1, therein is shown an image processing system 100 in an embodiment of the present invention. The image processing system 100 can receive a first image 104 and a second image 106 at an imaging sensor 108 in an imaging device 102. The first image 104 and the second image 106 can be captured using different values for the aperture settings.

The image processing system 100 can capture the first image 104 and the second image 106 in a variety of ways. For example, the first image 104 and the second image 106 can be formed by sequentially capturing a scene 140 with the imaging sensor 108.

The first image 104 and the second image 106 can include image metadata 110. The image metadata 110 is information about the associated image. For example, the image metadata 110 can include information about the physical properties of the image processing system 100 when the first image 104 or the second image 106 was created. In another example, the image metadata 110 can be the picture information recorded with the digital image in a digital camera.

The image metadata 110 can include a variety of information. For example, the image metadata 110 can include photographic properties, imaging device orientation, lens information, aperture information, device location, optical parameters, settings, light levels, lens information, or a combination thereof.

The image metadata 110 can include an aperture setting 116. The aperture setting 116 is the size of the opening for the lens of the image processing system 100. The aperture setting 116 can control the amount of light hitting the lens.

The first image 104 can include a first aperture 118. The first aperture 118 is the aperture setting 116 used to form the first image 104. The second image 106 can include a second aperture 120. The second aperture 120 is the aperture setting 116 used to form the second image 106.

A received image 114, such as the first image 104 and the second image 106, can be decomposed into different color channels 122. The color channels 122 are the color components for an image.

The color channels 122 can implemented in a variety of ways depending on the color model. The color model describes the way colors are represented in an image. For example, in a greyscale image, there is only one color channel. An image using the CMYK color model (cyan, magenta, yellow, and key/black) can have four of the color channels 122.

In another example, the received image 114 using the RGB color model (red, green, blue) can have three of the color channels 122. The received image 114 can include a red channel 124, a green channel 126, and a blue channel 128.

The first image 104 and the second image 106 each having the image metadata 110 can be transferred within the image processing system 100 to a display device 130 over a communication link 132. The display device 130 is a unit capable of displaying a display image 138 on a display unit 136. For example, the display device 130 can be a handheld device with a liquid crystal display unit for viewing images.

The image processing system 100 can include a depth map 134. The depth map 134 is information describing the distance from points on an image to the image processing system 100. The depth map 134 can be used to form a display image 138, such as a 3-dimensional image, for display on the display device 130.

The communication link 132 is a mechanism for transferring information. For example, the communication link 132 can be an internal computer bus, an inter-device bus, a network link, or a combination thereof. Although the image processing system 100 and the display device 130 are depicted as separate devices, it is understood that the image processing system 100 the display device 130 may be implemented as a single integrated device.

Figure 2:
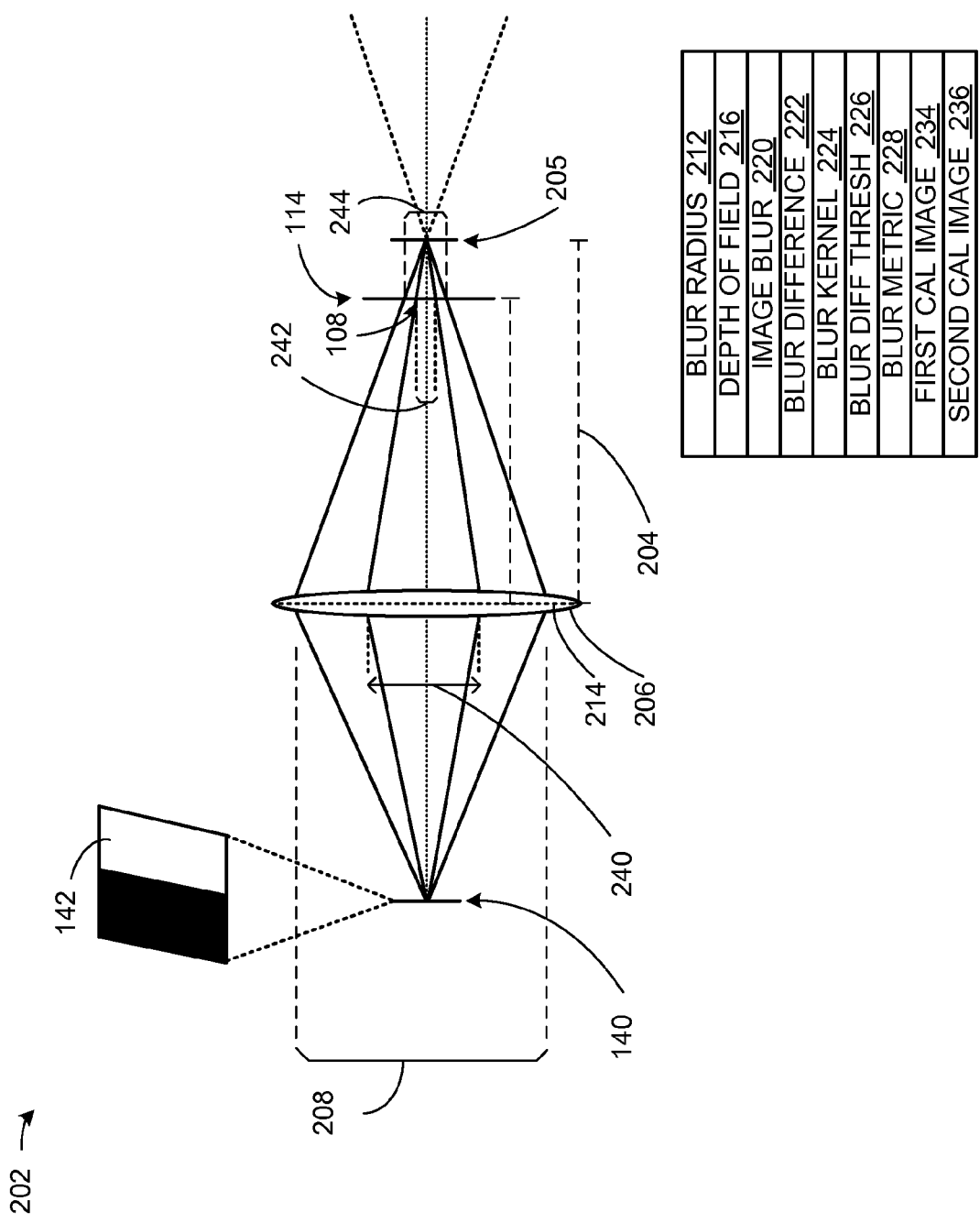
FIG. 2 is an example of an imaging system.

Referring now to FIG. 2, therein is shown an example of an imaging system 202. The imaging system can include a lens 206 having a lens diameter 214, and the imaging sensor 108 for receiving the received image 114. The received image 114 describes all images received at the imaging sensor 108 and can include the first image 104 of FIG. 1, the second image 106 of FIG. 1, a first calibration image 234, a second calibration image 236, or a combination thereof.

The received image 114 is an optical representation of the scene 140. For example, the received image 114 can include a calibration target image, a point source, an object, a pattern image, a geometric pattern, or a combination thereof.

In a further example, the received image 114 can include a step edge image 142. The step edge image 142 is a reference image having one side black and one side white.

The received image 114 is the representation of the scene 140 at the imaging sensor 108. The light from the scene 140 passes through the lens 206 to form the received image 114.

The lens 206 is an optical element for transmitting and refracting light. The lens 206 can be for converging or diverging light.

The lens 206 can be formed from a variety of materials. For example, the lens 206 can be formed from glass, plastic, liquid, or other transparent materials. In another example, the lens 206 can be formed from Fresnel elements.

The lens 206 can have a variety of configurations. For example, the lens 206 can be a simple lens having a single optical element. In another example, the lens 206 can be a compound lens having an array of multiple simple lenses.

The lens 206 can have a lens diameter 214 and the aperture setting 116 of FIG. 1. The lens diameter 214 is the maximum distance from one side of the lens 206 to the opposite side. The aperture setting 116 represents the size of an opening where light can pass through the lens 206. The aperture setting 116 can determine an aperture diameter 208. The aperture setting 116 is equal to or smaller than the lens diameter 214. The aperture setting 116 can be used to reduce the amount of light passing through the lens 206.

The lens 206 can have a lens focal length 204. The lens focal length 204 is the distance between the lens 206 and a focal point 205 of the lens 206.

The scene 140 is in focus when the received image 114 is sharpest and has the highest contrast. When the received image 114 is out of focus and less sharp, it will have a lower contrast. The first image 104 can be taken where the first aperture 118 of FIG. 1 is a smaller aperture 240, as indicated by a higher f-number, and generally be sharper than the second image 106. The second image 106 can be taken where the second aperture 120 of FIG. 1 is a larger aperture 208.

The depth of field 216 is the distance range where the object of the scene is acceptable sharp. The depth of field 216 can be the measure of the tolerance of the placement of the image plane in relation to the lens 206.

The first image 104 and the second image 106 can be separated by a blur difference 222. The blur difference 222 is a measurement of the level of blur for each of the images.

The amount of blur of an image can be measured in a variety of ways. For example, the blur can be measured by comparing a blur radius 212 of a target image at a given focal distance from the lens 206. The blur radius 212 is the size of a circle formed by an out-of-focus image of a point source in the scene 140. The blur radius 212 is proportional to the aperture diameter 208 of the lens 206. The blur radius 212 can be determined using the smaller aperture 240 having a smaller radius 242. In another example, the blur radius 212 can be determined by using the larger aperture 208 using a larger aperture 244.

The blur radius 212 is proportional to the aperture diameter 208. Given two different lens aperture f-numbers $A_1$ and $A_2$, where $A_1$ can be the first aperture 118 and $A_2$ can be the second aperture 120, the defocus blur relationship can be described by:

$$\frac{\sigma_2}{\sigma_1} = \frac{A_1}{A_2} \qquad (1)$$

where $\sigma_1$ and $\sigma_2$ are the blur standard deviation (proportional to radius) for $F\text{-}A_1$ and $F\text{-}A_2$, respectively.

The blur difference model can be calculated from the aperture. The blur difference 222 can be calculated by:

$$\sigma_2^2 - \sigma_1^2 = \left(\left(\frac{A_1}{A_2}\right)^2 - 1\right)\sigma_1^2 \qquad (2)$$

where $\sigma_2^2 - \sigma_1^2$ may be obtained from iterative convolution. Then Equation 2 can be solved for the defocus blur $\sigma_1$.

The depth of field 216 can be determined based on the aperture diameter 208, commonly known as the f-number. The f-number is the ratio of the lens focal length 204 to the aperture diameter 208.

Reducing the aperture diameter 208 can increase the size of the depth of field 216. The size of the circle of confusion can shrink by reducing the amount of light traversing the lens. The circle of confusion is an optical spot caused by the cone of light rays from a lens not coming to a perfect focus.

The degree of image blur 220 depends inversely on the lens f-number. Low f-numbers, such as f1.4 to f2.8, are sensitive to defocus and have a shallow depth of field. High f-numbers, such as f15-f32 are highly tolerant of defocus and have large depth of field. The depth of field 216 is the range of distances for which object points have acceptable sharpness.

In illustrative example, the image processing system 100 of FIG. 1 can capture two images, the first image 104 and the second image 106, each having a different aperture setting. The first image 104 and the second image 106 can be used to form a depth map based on the differences due to the aperture differences.

As a further example, the first image 104 can have a larger f-number resulting in a sharper image. The second image 106 can have a smaller f-number resulting in a less sharp image. Although the first image 104 is described as having a larger f-number than the second image 106, it is understood that the second image can have a larger f-number than the first image 104.

The blur difference 222 between the first image 104 and the second image 106 is the difference in a blur metric 228 used to measure the level of defocus of an image. The blur difference 222 can be modeled by a point spread function P from the first image 104 to the second image 106 with the equation:

$$F_1 * P = F_2 \qquad (3)$$

where the asterisk * operator indicate the operation of a two dimensional convolution. The point spread function P can be approximated using a series of convolutions by a blur kernel 224, designated as K, as follows:

$$P = K * K * \ldots * K \qquad (4)$$

The blur kernel 224 can have various values. It is understood that the values, size, and dimensionality of the blur kernel 224 are exemplary and can be different that as described below. For example, the blur kernel 224 can be a 3×3 matrix with values as follows:

$$K = \frac{1}{64}\begin{pmatrix} 1 & 6 & 1 \\ 6 & 36 & 6 \\ 1 & 6 & 1 \end{pmatrix} \qquad (5)$$

In another example, the blur kernel 224 can be a 3×3 matrix with values as follows:

$$K = \frac{1}{48}\begin{pmatrix} 1 & 4 & 1 \\ 4 & 28 & 4 \\ 1 & 4 & 1 \end{pmatrix} \quad (6)$$

In yet another example, the blur kernel 224 can be a 3×3 matrix with values as follows:

$$K = \frac{1}{256}\begin{pmatrix} 1 & 14 & 1 \\ 14 & 196 & 14 \\ 1 & 14 & 1 \end{pmatrix} \quad (7)$$

The blur kernel 224 can implement a variety of functions. For example, the blur kernel 224 can function as a low pass filter, a high pass filter, an impulse filter, or a combination thereof.

The blur difference 222 in Equation 2 between the first image 104 and the second image 106 can be measured by the number of convolutions. The blur difference 222 is calculated iteratively by applying the blur kernel 224 to the first image 104 and calculating a mean square error between the convoluted image and the second image 106. The iterative convolution process can continue until the blur difference between the first image 104 and the second image 106 reaches a minimum and is within a blur difference threshold 226. The blur difference threshold 226 can represent the minimum blur difference acceptable.

Calibration images can be taken by using a step edge image 142. The first calibration image 234 and the second calibration image 236 can be used to create a model for blur difference 222 of the lens 206 for different aperture values.

In an illustrative example, when the size of the aperture changes, the effective diameter of lens 206 changes. The imaging system 202 can include a smaller aperture 240 with a diameter smaller than the aperture diameter 208.

When the diameter of the lens becomes smaller, the blur radius 212 will also become smaller. The smaller aperture 240 can result in the smaller radius 242 for the blur radius 212. The smaller radius 242 results in a sharper image.

The first image 104 and the second image 106 are taken at different aperture sizes by the imaging sensor 108. Each image has a different amount of blur. The blur difference 222 between these two images can be calculated by Equation (2) and can be obtained using iterative convolution.

When the two images are being taken, only the aperture size changes. The distance between the scene 140 and the lens 206, and the distance between the lens 206 and the imaging sensor 108 should remain the same.

Figure 3:
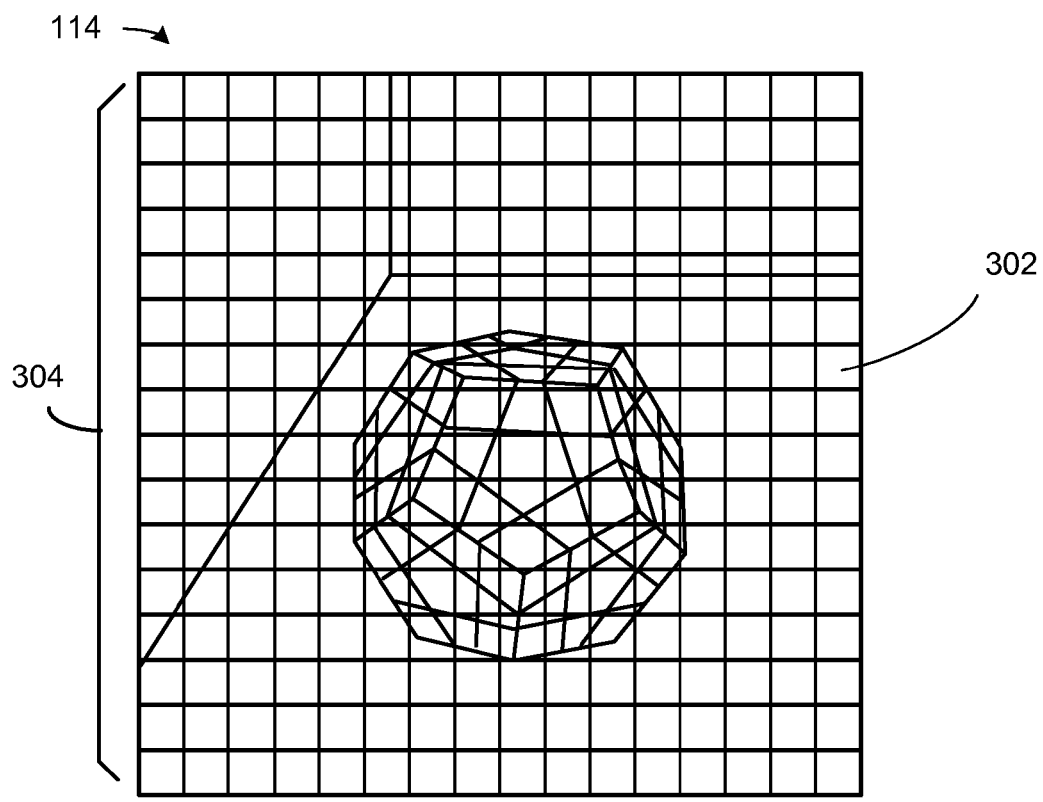
FIG. 3 is an example of a received image.

Referring now to FIG. 3, therein is shown an example of a received image 114. The received image 114 can be the first image 104 of FIG. 1, the second image 106 of FIG. 1, or a combination thereof.

The received image 114 can be partitioned into a grid array 304 by dividing the first image 104 and the second image 106 into grid elements 302. The grid array 304 is an image divided into a grid configuration. The grid elements 302 are sub-pictures that make up the received image 114. For example, the first image 104 and the second image 106 can be partitioned into the grid array 304 of the grid elements 302 each having dimensions of 16×16 pixels, 32×32 pixels, or another regular rectangular size. Each of the grid elements 302 can represent a portion of the image.

Figure 4:
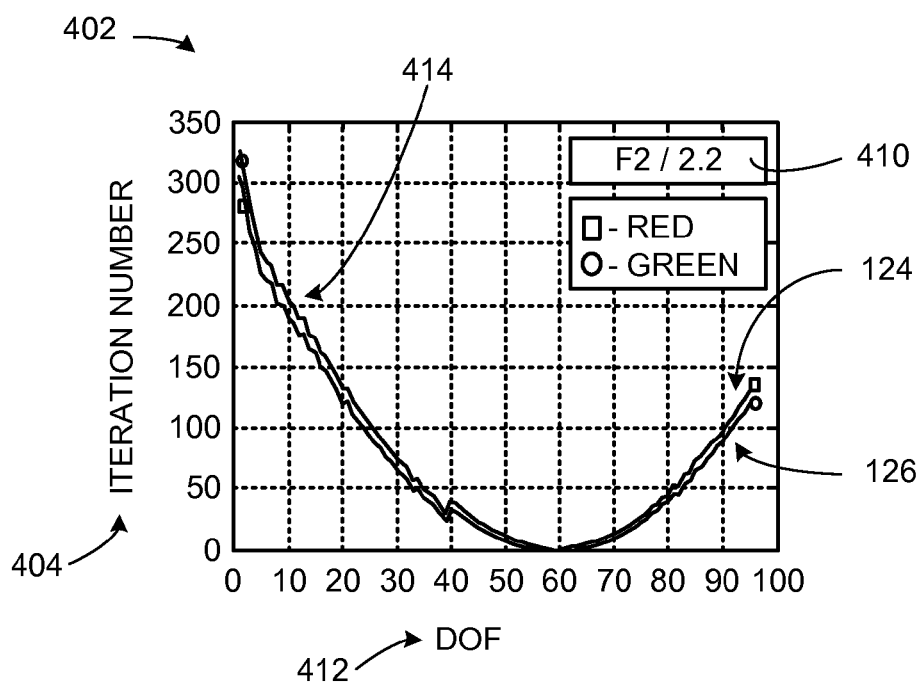
FIG. 4 is an example of a matching curve chart.

Referring now to FIG. 4, therein is shown an example of a matching curve chart 402. The matching curve chart 402 includes a matching curve 414 for the red channel 124 and the green channel 126 for two images having different apertures.

The matching curve 414 is a relationship between an iteration number 404 and the focus distance, where the focus distance is represented by a depth of field number 412 (DOF number). The matching curve 414 can be calculated over a range of distances. For example, the matching curve 414 can be calculated from a DOF number 412 ranging from 0 to 100.

The matching curve chart 402 is formed by calculating the iteration number 404 for the red channel 124 and the green channel 126 across the entire distance range of the lens 206 of FIG. 2 for sets of aperture pairs 410. The aperture pairs 410 are sets of two different values for the aperture setting 116 of FIG. 1. For example, the aperture pairs 410 can have the values for the aperture setting 116 of f2 and f2.2.

The iteration number 404 can be a representation of the blur difference 222 of FIG. 2 between the two images. The two images can be taken with different values for the aperture setting 116. The focusing position shift between the red channel 124 and the green channel 126 can be due to chromatic aberration.

The iteration number 404 represents the number of convolution iterations required to bring the two images to equivalent levels of the blur metric 228 of FIG. 2. The iteration number 404 can correspond to the number of operations in Equation 4 when used to satisfy the criteria of Equation 3 when performing iterative convolution with the blur kernel 224 of FIG. 2. The iteration number 404 is the number of times the convolution operation is performed on the first image 104 of FIG. 1 to reach a comparable value for the blur metric 228 for one of the color channels of the second image 106 of FIG. 1. The iteration number 404 can be calculated for both the red channel 124 and the green channel 126 on both images.

The matching curve 414 for the red channel 124 is below the values for the matching curve of the green channel 126 for lower values of the depth of field 216 of FIG. 2. The values for the matching curve for the red channel 124 and the green channel 126 have a matching value of zero iterations when the received image 114 of FIG. 1 is completely in focus. The matching curve 414 for the red channel 124 is above the values for the matching curve of the green channel 126 for higher values of the depth of field 216.

The matching curve chart 402 for the depth of field can be calculated for a variety of configurations. For example, the matching curve chart 402 for the depth of field can be calculated for a given optical device, such as a Sony™ RX1 camera and lens. The matching curve chart 402 for the depth of field can be formed during a calibration phase of the lens 206 using a calibration target image, such as the step edge image 142 of FIG. 1, positioned 65 centimeters (cm) away from the lens 206. The matching curve chart 402 can be calculated for one of the aperture pairs 410 with the aperture setting 116 set at f2 and f2.2.

In an illustrative example, the matching curve 414 of the red channel 124 and the green channel 126 can be modelled by fitting a quadratic function to both matching curve 414. The quadratic model can be written as:

$$y = c(x-d)^2 \quad (8)$$

where "y" is an iteration number 404 in FIG. 4 on the vertical axis, and "x" is the lens focus position in DOF on the horizontal axis. The parameters "c" and "d" are equation constants. The value for "c" can be 0.096738 and the value for "d" can be 56.810. The iteration number difference 506 is the difference between the iteration number 404 of FIG. 4 of the red channel 124 and the green channel 126.

In a further example, $I_r$, $I_g$ can denote the iteration number 404 for the red channel 124 and the iteration number 404 for the green channel 126, respectively. Assume the value of the current lens focus position (204) of FIG. 2 "f" is a known distance. The depth expressed in terms of depth of field (DOF) can be obtained by:

$$\text{depth} = \begin{cases} f + \frac{1}{2}\left(\sqrt{\frac{I_r}{c}} + \sqrt{\frac{I_g}{c}}\right) & \text{if } I_r < I_g \\ f & \text{if } I_r = I_g \\ f - \frac{1}{2}\left(\sqrt{\frac{I_r}{c}} + \sqrt{\frac{I_g}{c}}\right) & \text{if } I_r > I_g \end{cases} \quad (9)$$

where "c" is the coefficient of the quadratic model in Equation 8.

Figure 5:
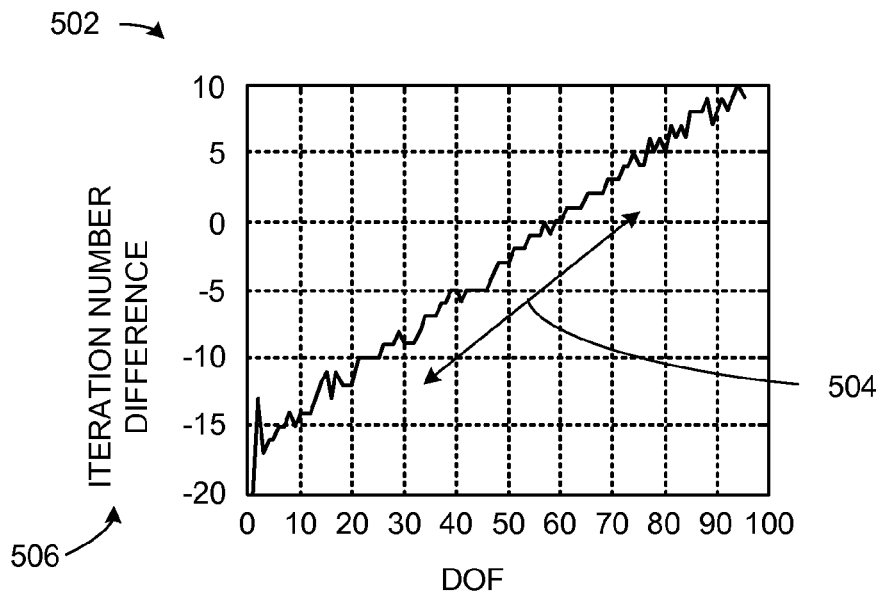
FIG. 5 is an example of a matching curve difference chart.

Referring now to FIG. 5, therein is shown an example of a matching curve difference chart 502. The matching curve difference chart 502 can show the difference between the two color channels of the matching curve chart 402 of FIG. 4 for the depth of field 216 of FIG. 2.

The matching curve difference chart 502 can be calculated by taking the difference between two of the matching curve 414 of FIG. 4 of the matching curve chart 402. The difference between the matching curve 414 is larger further away from the in-focus distance.

The difference between the matching curve 414 for the red channel 124 of FIG. 1 and the green channel 126 of FIG. 1 can be approximated by a linear curve having a matching curve difference slope 504. The matching curve difference slope 504 can be used to calculate the depth of field 216 based on the iteration number difference 506. The iteration number difference 506 is the difference between the iteration number 404 of FIG. 4 of the red channel 124 and the green channel 126.

The matching curve difference chart 502 can indicate the magnitude and direction the lens motion needed to achieve focus. The iteration number difference between the red channel 124 and the green channel 126 is bigger for larger apertures and for more out-of-focus blur. A positive value for the iteration number difference means the lens focuses at a distance that is farther than the object distance. A negative value means the lens focuses at distance that is closer than the object distance.

In an illustrative example, the matching curve difference chart 502 can be formed during a calibration phase of the lens 206 of FIG. 2 using the step edge image 142 of FIG. 1 set at 65 centimeters away from the lens 206.

The iteration number difference 506 between the red channel 124 and the green channel 126 can be represented by a linear model as:

$$y = ax + b \quad (10)$$

where "y" is the iteration number difference 506 on the vertical axis, a is the matching curve difference slope 504, and "x" is the lens focus position in terms of depth of field (DOF) on the horizontal axis.

In another example, the value of the matching curve difference slope "a" can be 0.283007 and the value for the offset "b" can be −16.596053. Assuming the current lens focus position (204) of FIG. 2 "f" is known, then the depth expressed in terms of depth of field can be obtained with a linear model as follows:

$$\text{Depth} = f - y/a \quad (11)$$

where "y" is the iteration number difference between the matching results for the red channel 124 and the green channel 126. The parameter "a" is the slope of the linear model, such as the matching curve difference slope 504.

Figure 6:
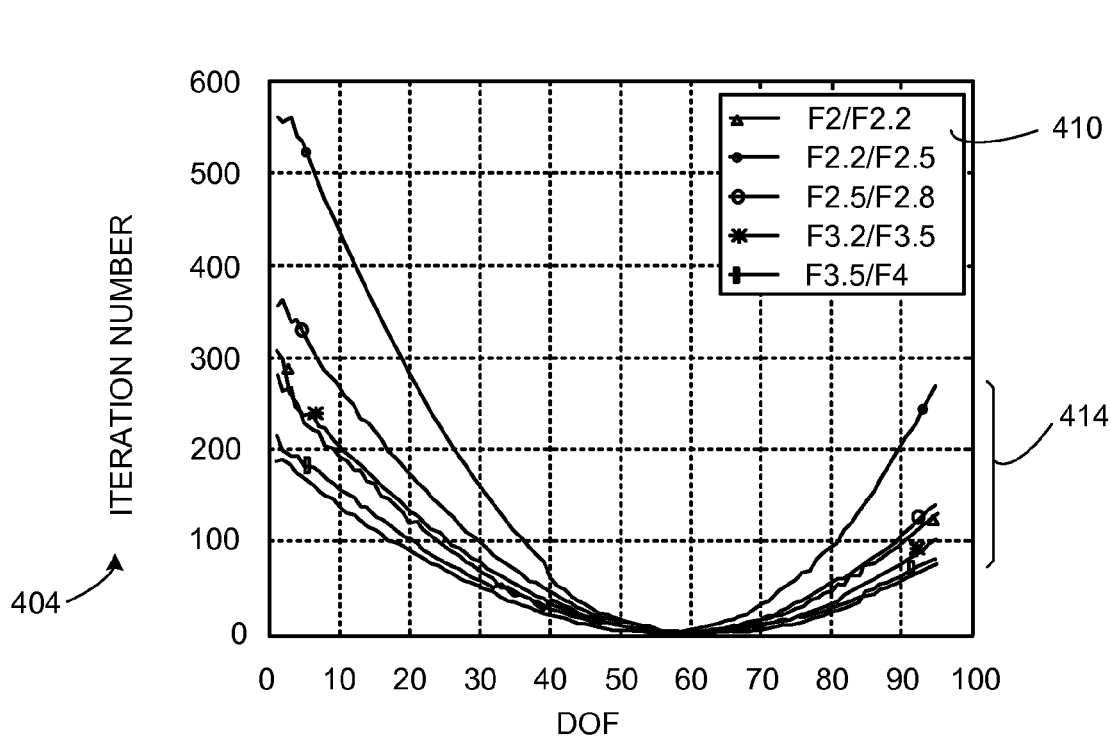
FIG. 6 is an example of a matching curve chart for multiple aperture pairs for the red channel.

Referring now to FIG. 6, therein is shown an example of a matching curve chart 602 for multiple aperture pairs for the red channel 124 of FIG. 1. The matching curve chart 602 for the depth of field can show the relationship between the iteration number 404 of FIG. 4 and the depth of field 216 of FIG. 2 for a set of the aperture pairs 410.

The aperture pairs 410 are sets of f-numbers. The matching curve 414 can be calculated for the red channel 124 for both of the values of the aperture setting 116 of FIG. 1 of each of the aperture pairs 410. The matching curve chart 602 can be calculated for the red channel 124 of the first calibration image 234 of FIG. 2 and the second calibration image 236 of FIG. 2 for each of the aperture pairs 410.

For example, the matching curve chart 402 of FIG. 4 for the depth of field can include the aperture pairs 410 for f2/F2.2, F2.2/F2.5, F2.5/F2.8, F3.2/F3.5, and F3.5/F4. There is a larger difference in the iteration number 404 for higher degrees of difference between the aperture pairs 410.

The matching curve chart 602 can be calculated for the first calibration image 234 and the second calibration image 236 for each of the aperture pairs 410.

Figure 7:
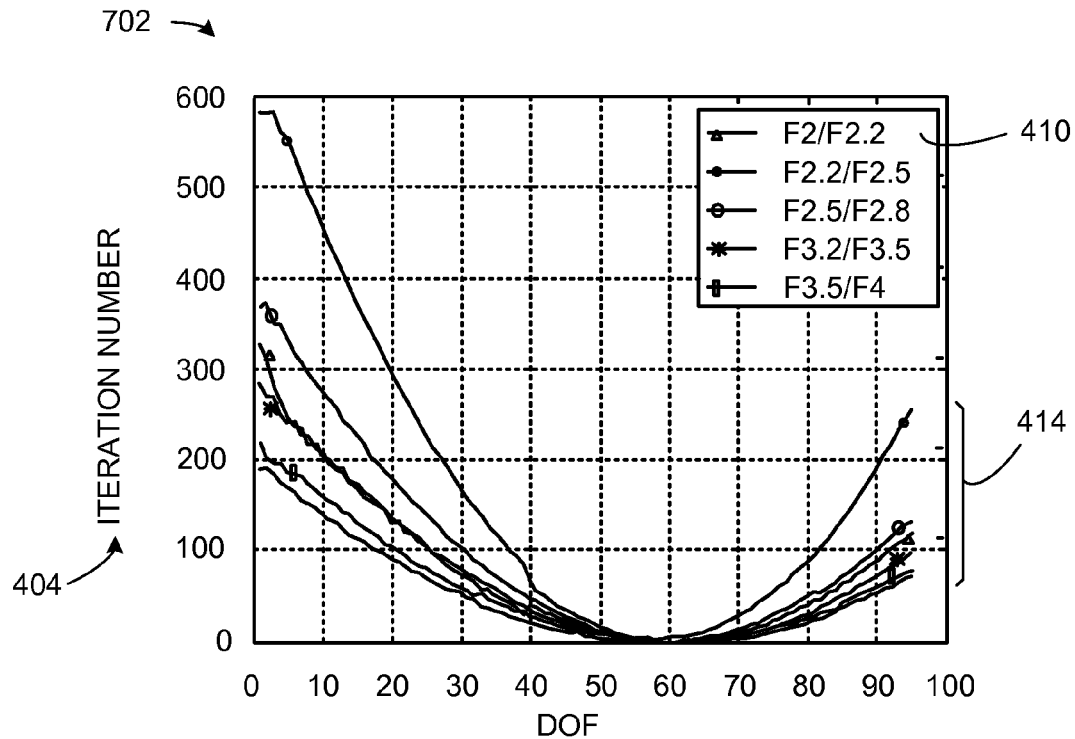
FIG. 7 is an example of a matching curve chart for multiple aperture pairs for the green channel.

Referring now to FIG. 7, therein is shown an example of a matching curve chart 702 for multiple aperture pairs for the green channel 126 of FIG. 1. The matching curve chart 702 for the depth of field can show the relationship between the iteration number 404 and the lens focus distance for different aperture pairs.

The aperture pairs 410 are sets of f-numbers. The matching curve 414 can be calculated for the green channel 126 for both of the values of the aperture setting 116 of FIG. 1 of each of the aperture pairs 410. The matching curve chart 602 of FIG. 6 can be calculated for the green channel 126 of the first calibration image 234 of FIG. 2 and the second calibration image 236 of FIG. 2 for each of the aperture pairs 410.

Figure 8:
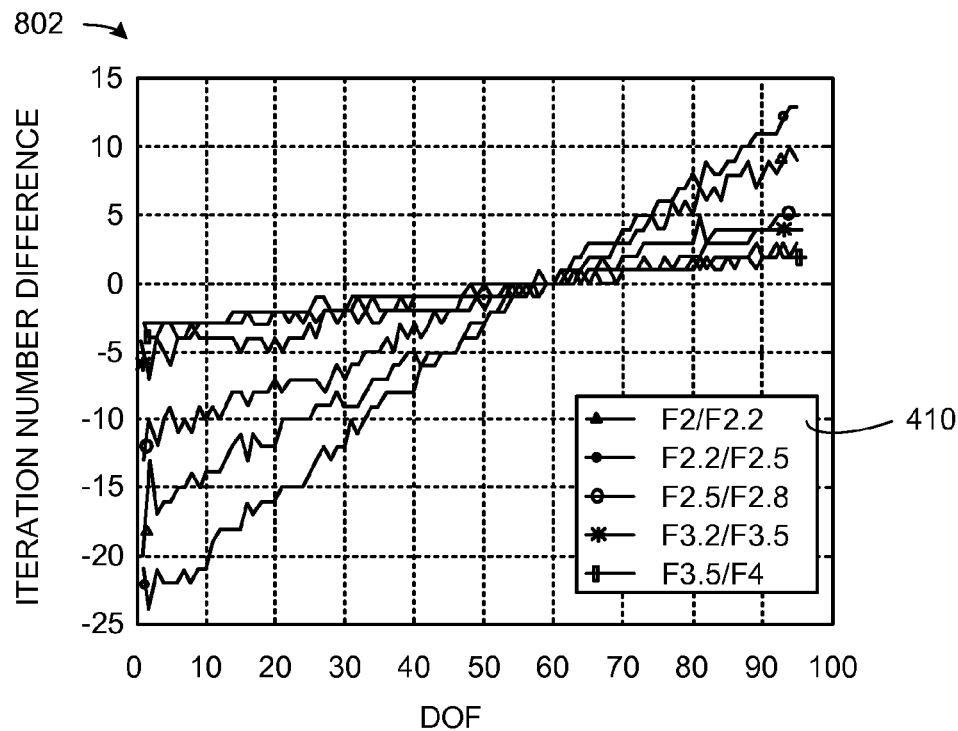
FIG. 8 is an example of a matching curve difference chart for multiple aperture pairs for the red channel and the green channel.

Referring now to FIG. 8, therein is shown an example of a matching curve difference chart 802 for multiple aperture pairs 410 for the red channel 124 of FIG. 1 and the green channel 126 of FIG. 1. The matching curve difference chart 502 of FIG. 5 can show the difference between the red channel 124 of FIG. 4 and the green channel 126 of FIG. 4 for each of the aperture pairs 410.

The result of the matching curve difference chart 802 is a set of linear curves showing the matching curve difference slope 504 of FIG. 5 between the red channel 124 of FIG. 1 and green channel 126 of FIG. 1 for each of the aperture pairs 410. The matching curve difference chart 802 can indicate the magnitude and direction the lens motion needed to achieve focus.

Figure 9:
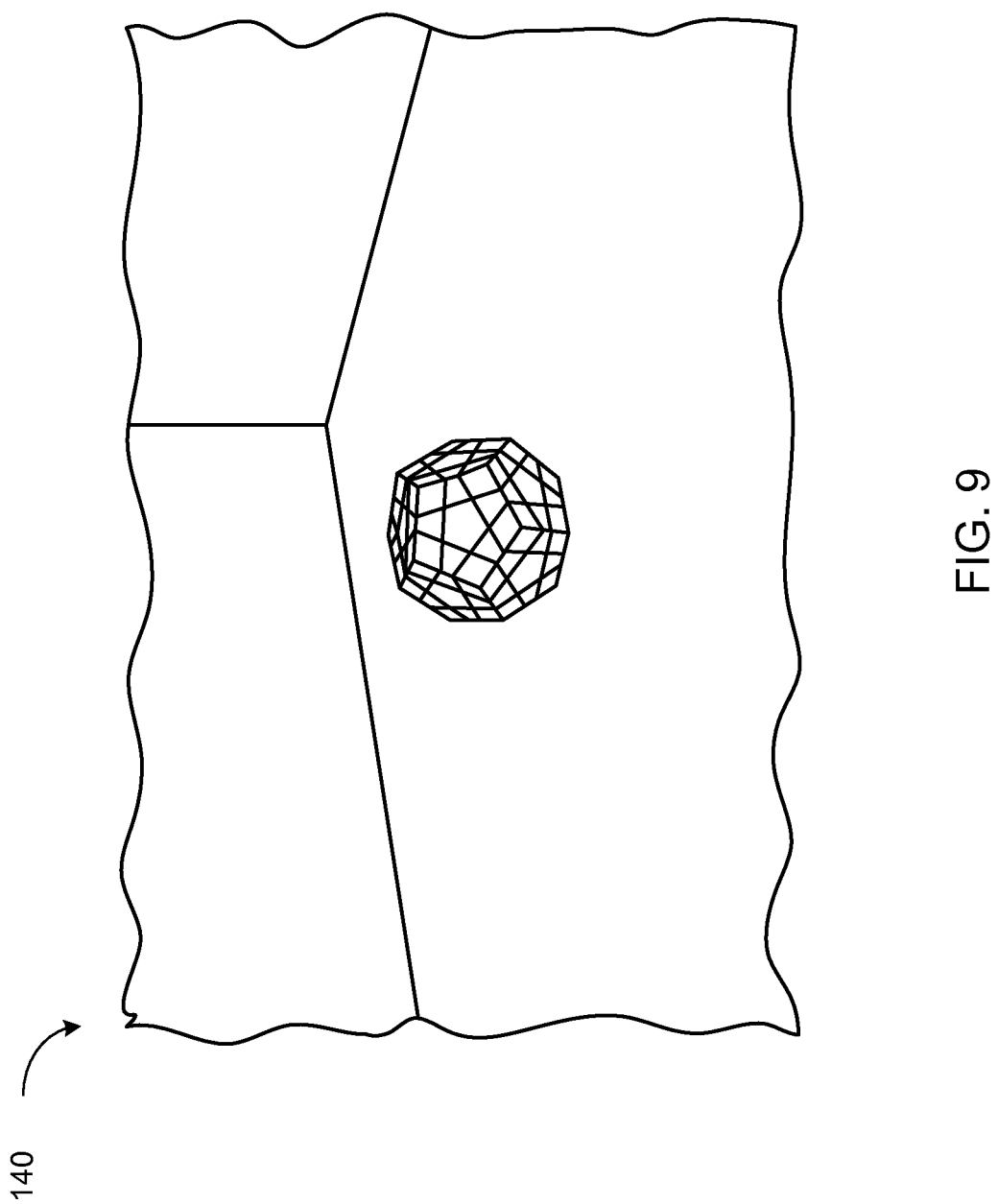
FIG. 9 is an example of the scene.

Referring now to FIG. 9, therein is shown an example of the scene 140. The received image 114 of FIG. 1 can include representations of objects in a physical setting in the scene 140. The received image 114 can include the first image 104 of FIG. 1, the second image 106 of FIG. 1, or a combination hereof.

Figure 10A:
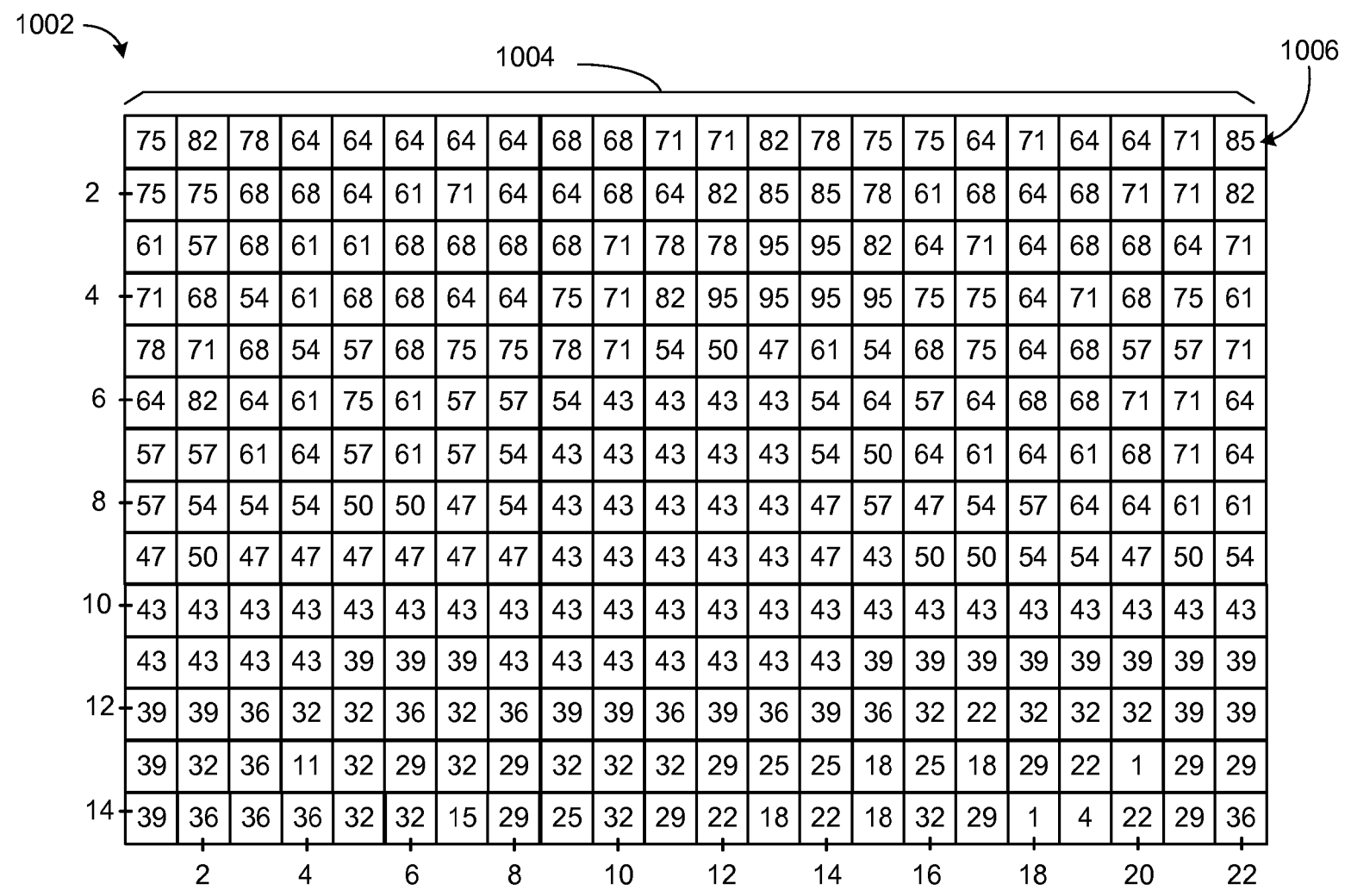

Referring now to FIG. 10A, therein is shown a first example of the depth map 1002. The depth map 1002 is an indicator of the distance from the objects to the image processing system 100 of FIG. 1 for each of the grid elements 302 of FIG. 3 of the received image 114 of FIG. 1. The depth map 1002 can be calculated using Equation 11.

The depth map 1002 can be a representation of the received image 114 having a depth grid 1004 overlaid on top of the received image 114. The depth grid 1004 can be a quantized representation of the received image 114 divided up into smaller grid units. For example, the depth grid 1004 can be an array of the grid elements 302. Each of the grid elements 302 can have an element depth 1006 associated with the grid elements 302 indicating the distance from the image processing system 100 to the corresponding region in the scene 140 of FIG. 1.

The value of the element depth 1006 can be expressed in a variety of ways. For example, the element depth 1006 can be expressed in terms of the depth of field (DOF) number. In another example, the element depth 1006 can be expressed in terms of a physical distance, such as centimeters, inches, feet, meters, or a combination thereof. In yet another example, the element depth 1006 can be expressed in relative terms indicating the relationship between depth levels.

Figure 10B:
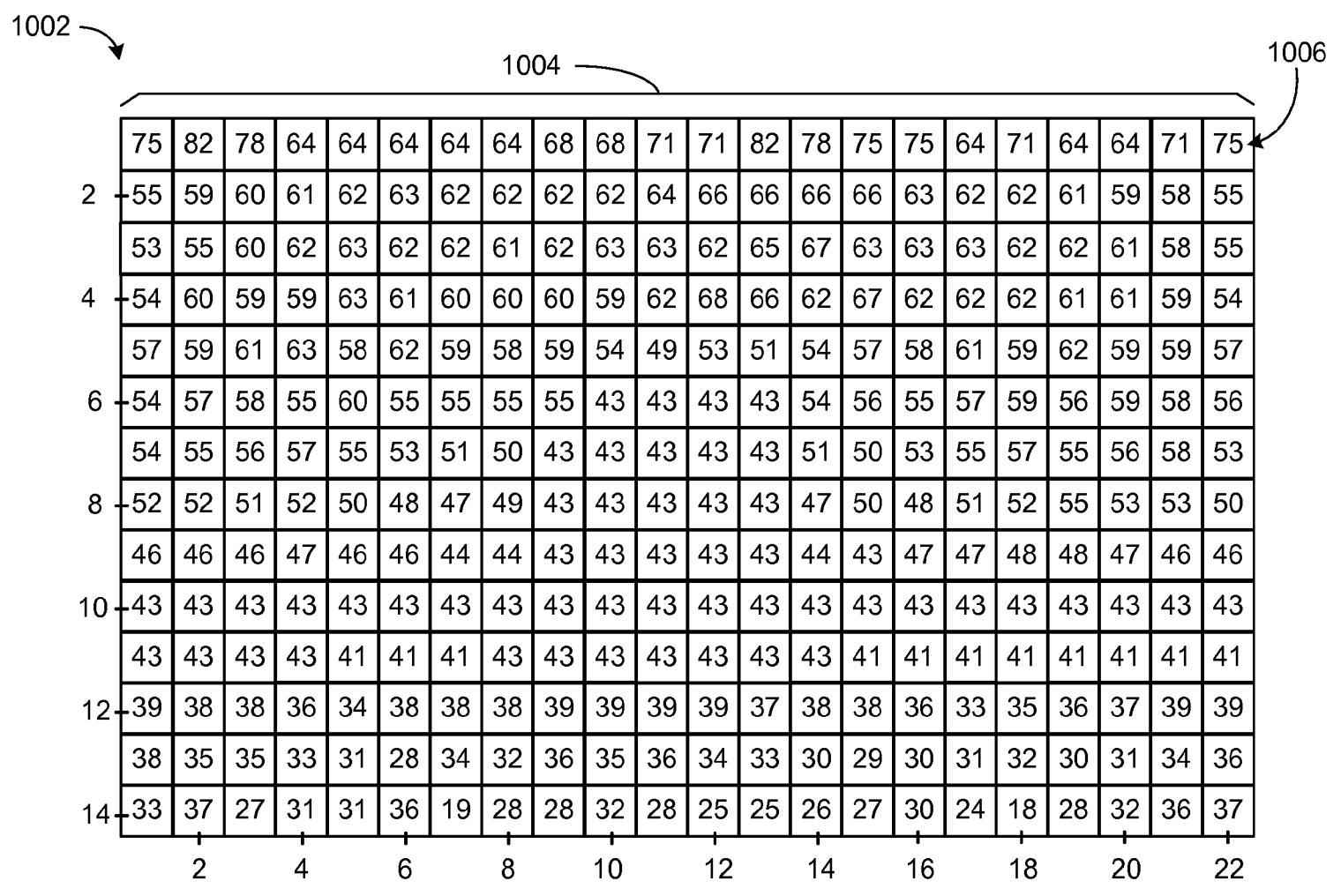

Referring now to FIG. 10B, therein is shown a second example of the depth map 1002. The depth map 1002 is an indicator of the distance from the objects to the image processing system 100 of FIG. 1 for each of the grid elements 302 of FIG. 3 of the received image 114 of FIG. 1. The depth map 1002 can be calculated using Equation 9.

The depth map 1002 can be a representation of the received image 114 having a depth grid 1004 overlaid on top of the received image 114. The depth grid 1004 can be a quantized representation of the received image 114 divided up into smaller grid units. For example, the depth grid 1004 can be an array of the grid elements 302. Each of the grid elements 302 can have the element depth 1006 associated with the grid elements 302 indicating the distance from the image processing system 100 to the corresponding region in the scene 140 of FIG. 1.

The value of the element depth 1006 can be expressed in a variety of ways. For example, the element depth 1006 can be expressed in terms of the depth of field (DOF) number. In another example, the element depth 1006 can be expressed in terms of a physical distance, such as centimeters, inches, feet, meters, or a combination thereof. In yet another example, the element depth 1006 can be expressed in relative terms indicating the relationship between depth levels.

Figure 11:
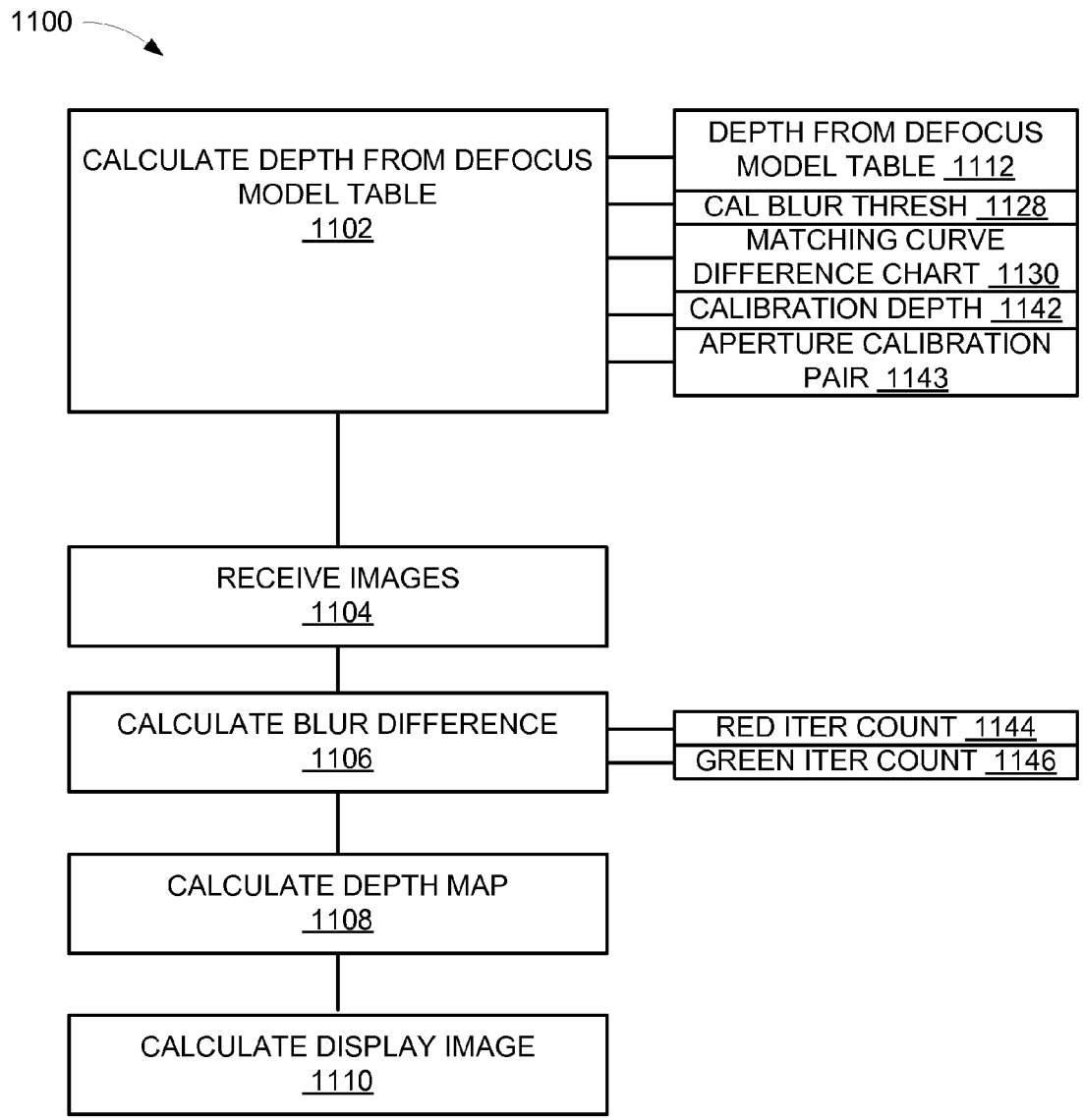
FIG. 11 is an example of a process flow of the image processing system with aperture depth estimation.

Referring now to FIG. 11, therein is shown an example of a process flow 1100 of the image processing system with aperture depth estimation. The process flow can include a calculate depth from defocus model table module 1102, a receive images module 1104, a calculate blur difference module 1106, a calculate depth map module 1108, and a calculate display image module 1110.

The calculate depth from defocus model table module 1102 can calculate a depth from defocus model table 1112 associated with the lens 206 of FIG. 2. The depth from defocus model table 1102 can store parameter values of "c" used in Equation 9. The depth from defocus model table 1102 can store the parameter values of "a" in Equation 11 for a set of aperture pairs.

Each of the aperture pairs 410 of FIG. 4 can be an aperture calibration pair 1143. The aperture calibration pair 1143 is one of the aperture pairs 410 used to calculate the depth from defocus model table 1112.

The depth from defocus model table 1112 can be calculated in a variety of ways. For example, the depth from defocus model table 1112 can be pre-calculated in a calibration mode, calculated during normal operation, or a combination thereof.

In an illustrative example, the depth from defocus model table 1112 can be calculated using the step edge image 142 of FIG. 1 as a target image set at a distance of 65 cm from the image processing system, such as a Sony RX1™ camera. The blur difference 222 of FIG. 2 can be calculated using iterative convolution with the blur kernel 224 of FIG. 2.

The calculate depth from defocus model table module 1102 can calculate the matching curve 414 of FIG. 4 for the aperture pairs 410 for the red channel 124 of FIG. 1 and the green channel 126 of FIG. 1. Each value of the matching curve 414 can be calculated for one of the aperture pairs 410 by taking a first calibration image 234 of FIG. 2 and a second calibration image 236 of FIG. 2 at the aperture setting 116 of FIG. 1 for one of the aperture pairs 410.

The matching curve 414 for each of the aperture pairs 410 can be calculated using iterative convolution. For each of the calibration images, the blur kernel 224 can be used to convolute the sharper of the two calibration images and the blur metric 228 of FIG. 2 can be calculated for the pair of calibration images. The iteration number 404 of FIG. 4 is calculated by measuring the number of convolution iterations required before the difference in the blur metric 228 of FIG. 2 is within a calibration blur threshold 1128 for each of the two calibration images.

The matching curve 414 can be calculated for each of the aperture pairs 410 for the red channel 124 and the green channel 126. The difference between the matching curve 414 for the two color channels can be calculated to generate a matching curve difference chart 1130. Alternatively, the blur difference 222 can be calculated using the quadratic model of Equation 8 where the matching curves for the two color channels can be modeled as a quadratic curve. The quadratic coefficient can be stored in the depth from defocus model table 1112. The matching curve difference chart 1130 can be modelled as a linear curve and can be characterized by the matching curve difference slope 504 of FIG. 5. The matching curve difference chart 1130 and the matching curve difference slope 504 can be calculated for each of the aperture pairs 410 and stored in the depth from defocus model table 1112 associated with the lens 206.

The depth from defocus model table 1112 can provide a mapping between the blur difference 222 between the red channel 124 and the green channel 126 for a particular value of the depth of field 216 of FIG. 2. The depth of field 216 can be used to represent the distance from the image processing system 100 of FIG. 1 to the grid elements 302 of FIG. 3 in the received image 114 of FIG. 1.

The receive images module 1104 can receive the first image 104 of FIG. 1 and the second image 106 of FIG. 1 at the image processing system 100. The first image 104 and the second image 106 can be separated by a time interval. For example, the first image 104 and the second image 106 can be sequential images. In another example, the first image 104 and the second image 106 can be frames in a video stream.

The first image 104 and the second image 106 are formed with different values of the aperture setting 116. For example, the first image 104 can have the first aperture 118 of FIG. 1. The second image 106 can have the second aperture 120 of FIG. 1.

The first image 104 and the second image 106 can each include the red channel 124 and the green channel 126. The receive images module 1104 can separate the first image 104 and the second image 106 into the red channel 124 and the green channel 126.

The first image 104 and the second image 106 can be partitioned into the grid array 304 of FIG. 3 by dividing the first image 104 and the second image 106 into the grid elements 302. Each of the grid elements 302 can include the red channel 124 and the green channel 126.

The receive images module 1104 can receive the first image 104 and the second image 106. After receiving the first image 104 and the second image 106, the control flow can pass to the calculate blur difference module 1106.

The calculate blur difference module 1106 can determine the blur difference 222 between the grid elements 302 of the first image 104 and the second image 106.

The red iteration count 1144 is the blur difference 222 between the red channel 124 of one of the grid elements 302 of the first image 104 and the corresponding one of the grid elements 302 of the second image 106. If the first image 104 is taken at a smaller aperture, then the red iteration count 1144 can be the number of convolution iterations required to bring the red channel 124 of one of the grid elements 302 of the first image 104 and the second image 106 to equivalent levels of the blur metric 228. If the second image 106 is taken with a smaller aperture, then the second image 106 can be convoluted with the blur kernel 224 until the blur metric 228 is within the blur difference threshold 226 of FIG. 2 of the blur metric 228 the first image 104.

The red iteration count 1144 represents the blur difference 222 between the first image 104 with the first aperture 118 and the second image 106 with the second aperture 120 for the red channel 124. The red iteration count 1144 can be calculated for each of the grid elements 302 for both images.

The green iteration count 1146 is the blur difference 222 between the green channel 126 of one of the grid elements 302 of the first image 104 and the corresponding one of the grid elements 302 of the second image 106. If the first image 104 is taken at a smaller aperture, then the green iteration count 1146 can be the number of convolution iterations required to bring the green channel 126 of one of the grid elements 302 of the first image 104 and the second image 106 to equivalent levels of the blur metric 228. If the second image 106 is taken at a smaller aperture, then the second image 106 can be convoluted with the blur kernel 224 until the blur metric 228 is within a blur difference threshold 226 of the blur metric 228 the first image 104.

The green iteration count 1146 represents the blur difference 222 between the first image 104 with the first aperture 118 and the second image 106 with the second aperture 120 for the green channel 126. The green iteration count 1146 can be calculated for each of the grid elements 302 for both images.

The calculate blur difference module 1106 is complete when the red iteration count 1144 and the green iteration count 1146 have been calculated for all of the grid elements 302 of the first image 104 and the second image 106. After completion, the control flow can pass to the calculate depth map module 1108.

It has been discovered that calculating the depth by determining the iteration number difference 506 increases processing speed and improve efficiency. By comparing the blur difference 222 for the red channel 124 and the green channel 126, the iteration number difference 506 is determined and the element depth 1006 of FIG. 10A is retrieved based on the iteration number difference 506 in the depth from defocus model table 1112.

The calculate depth map module 1108 can form the depth map 1002 of FIGS. 10A and 10B by determining the element depth 1006 from the lens 206 to the physical objects in each of the grid elements 302 for the first image 104 and the second image 106. The element depth 1006 is a measure of the distance between the lens 206 and the object in the grid elements 302.

The element depth 1006 can be calculated in a variety of ways. For example, the element depth 1006 can be calculated by comparing the iteration number difference 506 against the depth from defocus model table 1112 and identifying the element depth 1006 based on matching the depth of field number 412 of FIG. 4. In another example, the element depth 1006 can be determined by directly calculating the element depth 1006 using the iteration number difference 506 and the matching curve difference slope 504.

The iteration number difference 506 between the red iteration count 1144 and the green iteration count 1146 can correspond to a distance expressed as the depth of field number 412 on the matching curve difference chart 502 of FIG. 5. The iteration number difference 506 can be used to determine the element depth 1006 for the grid elements 302 can be determined expressed in terms of the depth of field number 412 based one of the aperture pairs 410 as defined by the first aperture 118 and the second aperture 120. The element depth 1006 from the matching curve difference chart 502 is measured in terms of the depth of field number 412 and is a relative measurement of distance.

Alternatively, the element depth 1006 can be directly calculated by multiplying the iteration number difference 506 by the matching curve difference slope 504. The element depth 1006 can be adjusted with an offset value as indicated by Equation 11.

The calculate depth map module 1108 is complete when the depth map 134 of FIG. 1 has been formed for each of the grid elements 302 of the first image 104. After completion, the control flow can pass to the calculate display image module 1110.

It has been discovered that calculating the depth map 134 based on iteration number difference 506 increases functionality. By providing a depth measurement using a single lens with two images having two difference apertures, the depth map 134 can be determined with fewer hardware elements.

It has been discovered that forming the depth map 134 based on the iteration number difference 506 increases functionality. By calculating iteration number difference 506 between the red iteration count 1144 and the green iteration count 1146 for the first image 104 having the first aperture 118 and the second image 106 having the second aperture 120, the element depth 1006 can be determined due to the difference in the aperture setting 116.

The calculate display image module 1110 can combine the first image 104 with the depth map 134 for the first image 104 to create the display image 138 of FIG. 1 for displaying on the display device 130 of FIG. 1. The display image 138 can be a variety of images. For example, the display image 138 can be a three dimensional representation of the first image 104, an augmented reality image with depth-based elements, or a combination thereof.

Figure 12:
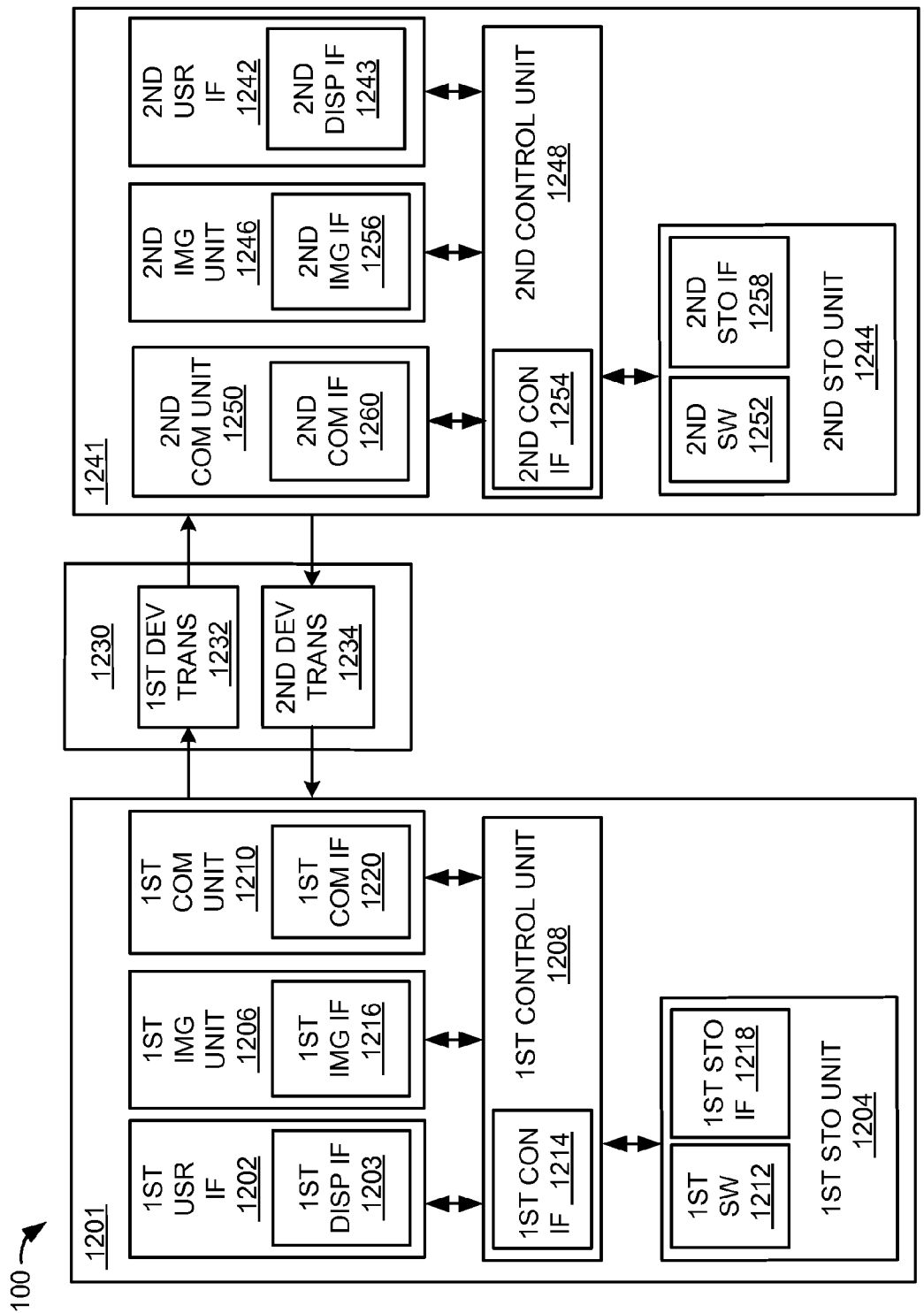
FIG. 12 is an example of a functional block diagram of the image processing system.

Referring now to FIG. 12, therein is shown an example of a functional block diagram of the image processing system 100. The image processing system 100 can include a first device 1201, a second device 1241 and a communication path 1230.

The image processing system 100 can be implemented using the first device 1201, the second device 1241, and the communication path 1230. For example, the first device 1201 can implement the imaging device 102 of FIG. 1, the second device 1241 can implement the display device 130 of FIG. 1, and the communication path 1230 can implement the communication link 132 of FIG. 1. However, it is understood that the image processing system 100 can be implemented in a variety of ways and the functionality of the imaging device 102, the display device 130, and the communication path 1230 can be partitioned differently over the first device 1201, the second device 1241, and the communication path 1230.

The first device 1201 can communicate with the second device 1241 over the communication path 1230. The first device 1201 can send information in a first device transmission 1232 over the communication path 1230 to the second device 1241. The second device 1241 can send information in a second device transmission 1234 over the communication path 1230 to the first device 1201.

For illustrative purposes, the image processing system 100 is shown with the first device 1201 as a client device, although it is understood that the image processing system 100 can have the first device 1201 as a different type of device. For example, the first device can be a server.

Also for illustrative purposes, the image processing system 100 is shown with the second device 1241 as a server, although it is understood that the image processing system 100 can have the second device 1241 as a different type of device. For example, the second device 1241 can be a client device.

For brevity of description in this embodiment of the present invention, the first device 1201 will be described as a client device, such as a video camera, smart phone, or a combination thereof. The present invention is not limited to this selection for the type of devices. The selection is an example of the present invention.

The first device 1201 can include a first control unit 1208. The first control unit 1208 can include a first control interface 1214. The first control unit 1208 can execute a first software 1212 to provide the intelligence of the image processing system 100.

The first control unit 1208 can be implemented in a number of different manners. For example, the first control unit 1208 can be a processor, an embedded processor, a microprocessor, a hardware control logic, a hardware finite state machine (FSM), a digital signal processor (DSP), or a combination thereof.

The first control interface 1214 can be used for communication between the first control unit 1208 and other functional units in the first device 1201. The first control interface 1214 can also be used for communication that is external to the first device 1201.

The first control interface 1214 can receive information from the other functional units or from external sources, or can transmit information to the other functional units or to external destinations. The external sources and the external destinations refer to sources and destinations external to the first device 1201.

The first control interface 1214 can be implemented in different ways and can include different implementations depending on which functional units or external units are being interfaced with the first control interface 1214. For example, the first control interface 1214 can be implemented with electrical circuitry, microelectromechanical systems (MEMS), optical circuitry, wireless circuitry, wireline circuitry, or a combination thereof.

The first device 1201 can include a first storage unit 1204. The first storage unit 1204 can store the first software 1212. The first storage unit 1204 can also store the relevant information, such as images, syntax information, videos, profiles, display preferences, sensor data, or any combination thereof.

The first storage unit 1204 can be a volatile memory, a nonvolatile memory, an internal memory, an external memory, or a combination thereof. For example, the first storage unit 1204 can be a nonvolatile storage such as non-volatile random access memory (NVRAM), Flash memory, disk storage, or a volatile storage such as static random access memory (SRAM).

The first storage unit 1204 can include a first storage interface 1218. The first storage interface 1218 can be used for communication between the first storage unit 1204 and other functional units in the first device 1201. The first storage interface 1218 can also be used for communication that is external to the first device 1201.

The first device 1201 can include a first imaging unit 1206. The first imaging unit 1206 can capture the first image 104 of FIG. 1 and the second image 106 of FIG. 1. The first imaging unit 1206 can include a digital camera, a video camera, an optical sensor, or any combination thereof.

The first imaging unit 1206 can include a first imaging interface 1216. The first imaging interface 1216 can be used for communication between the first imaging unit 1206 and other functional units in the first device 1201.

The first imaging interface 1216 can receive information from the other functional units or from external sources, or can transmit information to the other functional units or to external destinations. The external sources and the external destinations refer to sources and destinations external to the first device 1201.

The first imaging interface 1216 can include different implementations depending on which functional units or external units are being interfaced with the first imaging unit 1206. The first imaging interface 1216 can be implemented with technologies and techniques similar to the implementation of the first control interface 1214.

The first storage interface 1218 can receive information from the other functional units or from external sources, or can transmit information to the other functional units or to external destinations. The external sources and the external destinations refer to sources and destinations external to the first device 1201.

The first storage interface 1218 can include different implementations depending on which functional units or external units are being interfaced with the first storage unit 1204. The first storage interface 1218 can be implemented with technologies and techniques similar to the implementation of the first control interface 1214.

The first device 1201 can include a first communication unit 1210. The first communication unit 1210 can be for enabling external communication to and from the first device 1201. For example, the first communication unit 1210 can permit the first device 1201 to communicate with the second device 1241, an attachment, such as a peripheral device or a computer desktop, and the communication path 1230.

The first communication unit 1210 can also function as a communication hub allowing the first device 1201 to function as part of the communication path 1230 and not limited to be an end point or terminal unit to the communication path 1230. The first communication unit 1210 can include active and passive components, such as microelectronics or an antenna, for interaction with the communication path 1230.

The first communication unit 1210 can include a first communication interface 1220. The first communication interface 1220 can be used for communication between the first communication unit 1210 and other functional units in the first device 1201. The first communication interface 1220 can receive information from the other functional units or can transmit information to the other functional units.

The first communication interface 1220 can include different implementations depending on which functional units are being interfaced with the first communication unit 1210. The first communication interface 1220 can be implemented with technologies and techniques similar to the implementation of the first control interface 1214.

The first device 1201 can include a first user interface 1202. The first user interface 1202 allows a user (not shown) to interface and interact with the first device 1201. The first user interface 1202 can include a first user input (not shown). The first user input can include touch screen, gestures, motion detection, buttons, slicers, knobs, virtual buttons, voice recognition controls, or any combination thereof.

The first user interface 1202 can include the first display interface 1203. The first display interface 1203 can allow the user to interact with the first user interface 1202. The first display interface 1203 can include a display, a video screen, a speaker, or any combination thereof.

The first control unit 1208 can operate with the first user interface 1202 to display video information generated by the image processing system 100 on the first display interface 1203. The first control unit 1208 can also execute the first software 1212 for the other functions of the image processing system 100, including receiving image information from the first storage unit 1204 for display on the first display interface 1203. The first control unit 1208 can further execute the first software 1212 for interaction with the communication path 1230 via the first communication unit 1210.

For illustrative purposes, the first device 1201 can be partitioned having the first user interface 1202, the first storage unit 1204, the first control unit 1208, and the first communication unit 1210, although it is understood that the first device 1201 can have a different partition. For example, the first software 1212 can be partitioned differently such that some or all of its function can be in the first control unit 1208 and the first communication unit 1210. Also, the first device 1201 can include other functional units not shown in FIG. 17 for clarity.

The image processing system 100 can include the second device 1241. The second device 1241 can be optimized for implementing the present invention in a multiple device embodiment with the first device 1201. The second device 1241 can provide the additional or higher performance processing power compared to the first device 1201.

The second device 1241 can include a second control unit 1248. The second control unit 1248 can include a second control interface 1254. The second control unit 1248 can execute a second software 1252 to provide the intelligence of the image processing system 100.

The second control unit 1248 can be implemented in a number of different manners. For example, the second control unit 1248 can be a processor, an embedded processor, a microprocessor, a hardware control logic, a hardware finite state machine (FSM), a digital signal processor (DSP), or a combination thereof.

The second control interface 1254 can be used for communication between the second control unit 1248 and other functional units in the second device 1241. The second control interface 1254 can also be used for communication that is external to the second device 1241.

The second control interface 1254 can receive information from the other functional units or from external sources, or can transmit information to the other functional units or to external destinations. The external sources and the external destinations refer to sources and destinations external to the second device 1241.

The second control interface 1254 can be implemented in different ways and can include different implementations depending on which functional units or external units are being interfaced with the second control interface 1254. For example, the second control interface 1254 can be implemented with electrical circuitry, microelectromechanical systems (MEMS), optical circuitry, wireless circuitry, wireline circuitry, or a combination thereof.

The second device 1241 can include a second storage unit 1244. The second storage unit 1244 can store the second software 1252. The second storage unit 1244 can also store the relevant information, such as images, syntax information, video, profiles, display preferences, sensor data, or any combination thereof.

The second storage unit 1244 can be a volatile memory, a nonvolatile memory, an internal memory, an external memory, or a combination thereof. For example, the second storage unit 1244 can be a nonvolatile storage such as non-volatile random access memory (NVRAM), Flash memory, disk storage, or a volatile storage such as static random access memory (SRAM).

The second storage unit 1244 can include a second storage interface 1258. The second storage interface 1258 can be used for communication between the second storage unit 1244 and other functional units in the second device 1241. The second storage interface 1258 can also be used for communication that is external to the second device 1241.

The second storage interface 1258 can receive information from the other functional units or from external sources, or can transmit information to the other functional units or to external destinations. The external sources and the external destinations refer to sources and destinations external to the second device 1241.

The second storage interface 1258 can include different implementations depending on which functional units or external units are being interfaced with the second storage unit 1244. The second storage interface 1258 can be implemented with technologies and techniques similar to the implementation of the second control interface 1254.

The second device 1241 can include a second imaging unit 1246. The second imaging unit 1246 can capture the first image 104 from the real world. The first imaging unit 1206 can include a digital camera, a video camera, an optical sensor, or any combination thereof.

The second imaging unit 1246 can include a second imaging interface 1256. The second imaging interface 1256 can be used for communication between the second imaging unit 1246 and other functional units in the second device 1241.

The second imaging interface 1256 can receive information from the other functional units or from external sources, or can transmit information to the other functional units or to external destinations. The external sources and the external destinations refer to sources and destinations external to the second device 1241.

The second imaging interface 1256 can include different implementations depending on which functional units or external units are being interfaced with the second imaging unit 1246. The second imaging interface 1256 can be implemented with technologies and techniques similar to the implementation of the first control interface 1214.

The second device 1241 can include a second communication unit 1250. The second communication unit 1250 can enable external communication to and from the second device 1241. For example, the second communication unit 1250 can permit the second device 1241 to communicate with the first device 1201, an attachment, such as a peripheral device or a computer desktop, and the communication path 1230.

The second communication unit 1250 can also function as a communication hub allowing the second device 1241 to function as part of the communication path 1230 and not limited to be an end point or terminal unit to the communication path 1230. The second communication unit 1250 can include active and passive components, such as microelectronics or an antenna, for interaction with the communication path 1230.

The second communication unit 1250 can include a second communication interface 1260. The second communication interface 1260 can be used for communication between the second communication unit 1250 and other functional units in the second device 1241. The second communication interface 1260 can receive information from the other functional units or can transmit information to the other functional units.

The second communication interface 1260 can include different implementations depending on which functional units are being interfaced with the second communication unit 1250. The second communication interface 1260 can be implemented with technologies and techniques similar to the implementation of the second control interface 1254.

The second device 1241 can include a second user interface 1242. The second user interface 1242 allows a user (not shown) to interface and interact with the second device 1241. The second user interface 1242 can include a second user input (not shown). The second user input can include touch screen, gestures, motion detection, buttons, slicers, knobs, virtual buttons, voice recognition controls, or any combination thereof.

The second user interface 1242 can include a second display interface 1243. The second display interface 1243 can allow the user to interact with the second user interface 1242. The second display interface 1243 can include a display, a video screen, a speaker, or any combination thereof.

The second control unit 1248 can operate with the second user interface 1242 to display information generated by the image processing system 100 on the second display interface 1243. The second control unit 1248 can also execute the second software 1252 for the other functions of the image processing system 100, including receiving display information from the second storage unit 1244 for display on the second display interface 1243. The second control unit 1248 can further execute the second software 1252 for interaction with the communication path 1230 via the second communication unit 1250.

For illustrative purposes, the second device 1241 can be partitioned having the second user interface 1242, the second storage unit 1244, the second control unit 1248, and the second communication unit 1250, although it is understood that the second device 1241 can have a different partition. For example, the second software 1252 can be partitioned differently such that some or all of its function can be in the second control unit 1248 and the second communication unit 1250. Also, the second device 1241 can include other functional units not shown in FIG. 17 for clarity.

The first communication unit 1210 can couple with the communication path 1230 to send information to the second device 1241 in the first device transmission 1232. The second device 1241 can receive information in the second communication unit 1250 from the first device transmission 1232 of the communication path 1230.

The second communication unit 1250 can couple with the communication path 1230 to send image information to the first device 1201 in the second device transmission 1234. The first device 1201 can receive image information in the first communication unit 1210 from the second device transmission 1234 of the communication path 1230. The image processing system 100 can be executed by the first control unit 1208, the second control unit 1248, or a combination thereof.

The functional units in the first device 1201 can work individually and independently of the other functional units. For illustrative purposes, the image processing system 100 is described by operation of the first device 1201. It is understood that the first device 1201 can operate any of the modules and functions of the image processing system 100. For example, the first device 1201 can be described to operate the first control unit 1208.

The functional units in the second device 1241 can work individually and independently of the other functional units. For illustrative purposes, the image processing system 100 can be described by operation of the second device 1241. It is understood that the second device 1241 can operate any of the modules and functions of the image processing system 100. For example, the second device 1241 is described to operate the second control unit 1248.

For illustrative purposes, the image processing system 100 is described by operation of the first device 1201 and the second device 1241. It is understood that the first device 1201 and the second device 1241 can operate any of the modules and functions of the image processing system 100. For example, the first device 1201 is described to operate the first control unit 1208, although it is understood that the second device 1241 can also operate the first control unit 1208.

The physical transformation from the images of physical objects of the scene 140 of FIG. 1 to displaying the images on the pixel elements of the display device 130 results in physical changes to the pixel elements of the display device 130 in the physical world, such as the change of electrical state the pixel element, is based on the operation of the image processing system 100. As the changes in the physical world occurs, such as the motion of the imaging sensor used to capture the scene 140, the movement itself creates additional information, such as the updates to the first image 104, that are converted back into changes in the pixel elements of the display device 130 for continued operation of the image processing system 100.

The first software 1212 of the first device 1201 can implement portions of the image processing system 100. For example, the first software 1212 can include the calculate depth from defocus model table module 1102, the receive images module 1104, and the calculate blur difference module 1106, the calculate depth map module 1108, and the calculate display image module 1110.

The first control unit 1208 can execute the first software 1212 for the calculate depth from defocus model table module 1102 to form the depth from defocus model table 1112. The first control unit 1208 can execute the first software 1212 for the receive images module 1104 to acquire the first image 104 and the second image 106. The first control unit 1208 can execute the first software 1212 for the calculate blur difference module 1106 to determine the matching curve difference slope 504 of FIG. 5. The first control unit 1208 can execute the first software 1212 for the calculate depth map module 1108 to calculate the depth map 134 of FIG. 1. The first control unit 1208 can execute the first software 1212 for the calculate display image module 1110 to calculate the display image 138 of FIG. 1.

The second software 1252 of the second device 1241 can implement portions of the image processing system 100. For example, the second software 1252 can include the calculate depth from defocus model table module 1102, the receive images module 1104, and the calculate blur difference module 1106, the calculate depth map module 1108, and the calculate display image module 1110.

The second control unit 1248 can execute the second software 1252 for the calculate depth from defocus model table module 1102 to form the depth from defocus model table 1112. The second control unit 1248 can execute the second software 1252 for the receive images module 1104 to acquire the first image 104 and the second image 106. The second control unit 1248 can execute the second software 1252 for the calculate blur difference module 1106 to determine the matching curve difference slope 504. The second control unit 1248 can execute the second software 1252 for the calculate depth map module 1108 to calculate the depth map 134. The second control unit 1248 can execute the second software 1252 for the calculate display image module 1110 to calculate the display image 138.

The image processing system 100 can be partitioned between the first software 1212 and the second software 1252. For example, the first software 1212 can include the calculate depth from defocus model table module 1102 and the receive images module 1104. The second software 1252 can include the calculate blur difference module 1106, the calculate depth map module 1108, and the calculate display image module. The first control unit 1208 can execute the modules partitioned to the first software 1212. The second control unit 1248 can execute modules partitioned to the second software 1252.

The image processing system 100 describes the module functions or order as an example. Each of the modules can operate individually and independently of the other modules. The modules can be partitioned differently. For example, the calculate blur difference module 1106 and the calculate depth map module 1108 can be combined.

Furthermore, data generated in one module can be used by another module without being directly coupled to each other. For example, the calculate depth map module 1108 can receive the first image 104 from the receive images module 1104.

The modules can be implemented in a variety of ways. The calculate blur difference module 1106 and the calculate depth map module 1108 can be implemented in hardware accelerators (not shown) within the first control unit 1208 or the second control unit 1248, or can be implemented in hardware accelerators (not shown) in the first device 1201 or the second device 1241 outside of the first control unit 1208 or the second control unit 1248.

Figure 13:
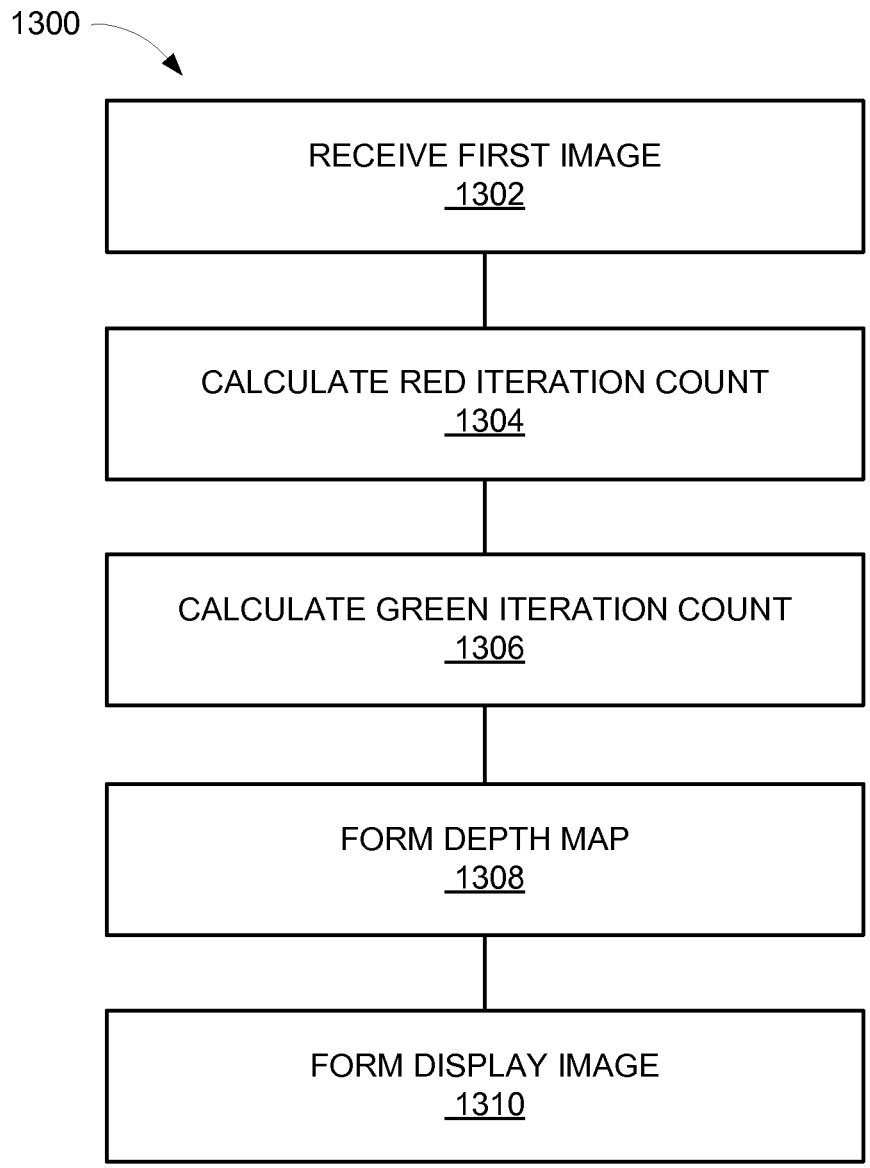
FIG. 13 is a flow chart of a method of operation of the image processing system in a further embodiment of the present invention.

Referring now to FIG. 13, therein is shown a flow chart of a method 1300 of operation of the imaging processing system in a further embodiment of the present invention. The method 1300 includes: receiving a first image having a first aperture and a second image having a second aperture with the first image and the second image each having a red channel and a green channel in a block 1302; calculating a red iteration count of a blur difference for the red channel of corresponding portions of the first image and the second image in a block 1304; calculating a green iteration count of the blur difference for the green channel of corresponding portions of the first image and the second image in a block 1306; forming a depth map having an element depth based on the red iteration count and the green iteration count in a block 1308; and forming a display image based on the first image and the depth map for displaying on a display device in a block 1310.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the image processing system of the present invention furnishes important and heretofore unknown and unavailable solutions, capabilities, and functional aspects for processing image content. The resulting processes and configurations are straightforward, cost-effective, uncomplicated, highly versatile and effective, can be surprisingly and unobviously implemented by adapting known technologies, and are thus readily suited for efficiently and economically manufacturing video coding devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   receiving a first image having a first aperture and a second image having a second aperture with the first image and the second image each having a red channel and a green channel;
   calculating a red iteration count of a blur difference for the red channel of corresponding portions of the first image and the second image;
   calculating a green iteration count of the blur difference for the green channel of corresponding portions of the first image and the second image;
   forming a depth map having an element depth based on the red iteration count and the green iteration count; and
   forming a display image based on the first image and the depth map for displaying on a display device.

2. The method as claimed in claim 1, wherein forming the depth map includes calculating a calibration depth for the blur difference between the red channel and the green channel of a first calibration image and a second calibration image for an aperture calibration pair.

3. The method as claimed in claim 1, wherein receiving the first image includes:
   receiving the first image with a lens having an aperture diameter set to the first aperture; and
   receiving the second image with the lens having the aperture diameter set to the second aperture.

4. The method as claimed in claim 1, wherein calculating the red iteration count includes:

calculating the blur difference between the red channel of the first image and the second image by iteratively convoluting the red channel of the second image with a blur kernel until a blur metric of the second image is within a blur difference threshold of the blur metric of the first image; and assigning the red iteration count the value of the number of convolutions needed to bring the blur metric of the second image within the blur difference threshold of the blur metric of the first image.

5. The method as claimed in claim 1, wherein calculating the depth map includes calculating the element depth using the formula:

$$\text{element depth} = \begin{cases} f + \dfrac{1}{2}\left(\sqrt{\dfrac{I_r}{c}} + \sqrt{\dfrac{I_g}{c}}\right) & \text{if } I_r < I_g \\ f & \text{if } I_r = I_g \\ f - \dfrac{1}{2}\left(\sqrt{\dfrac{I_r}{c}} + \sqrt{\dfrac{I_g}{c}}\right) & \text{if } I_r > I_g \end{cases}$$

where Ir is the red iteration count, is the green iteration count, c is a constant, and f is a current lens focus position.

6. A method of operation of an image processing system comprising:

receiving a first image having a first aperture and a second image having a second aperture with the first image and the second image each having a red channel and a green channel;

partitioning the first image and the second image into a grid array having grid elements with each of the grid elements of the first image having a corresponding one of the grid elements in the second image;

calculating a red iteration count of a blur difference for the red channel of one of the grid elements of the first image and the corresponding one of the grid elements of the second image;

calculating a green iteration count of the blur difference for the green channel of one of the grid elements of the first image and the corresponding one of the grid elements of the second image;

calculating an iteration number difference between the red iteration count and the green iteration count;

forming a depth map by correlating the iteration number difference with an element depth for one of the grid elements; and forming a display image based on the first image and the depth map for displaying on a display device.

7. The method as claimed in claim 6, wherein forming the depth map includes calculating the iteration number difference at a calibration depth for the blur difference between the red channel and the green channel of a first calibration image and a second calibration image for an aperture calibration pair.

8. The method as claimed in claim 6, wherein receiving the first image includes:

receiving the first image with a lens having an aperture diameter set to the first aperture; and receiving the second image with the lens having the aperture diameter set to the second aperture.

9. The method as claimed in claim 6, wherein calculating the red iteration count includes:

calculating the blur difference between the red channel of one of the grid elements of the first image and the red channel of the grid elements of the second image by iteratively convoluting the red channel of one of the grid elements of the second image with a blur kernel until a blur metric of one of the grid elements of the second image is within a blur difference threshold of the blur metric one of the grid elements of the first image; and assigning the red iteration count the value of the number of convolutions needed to bring the blur metric of the second image within the blur difference threshold of the blur metric of the first image.

10. The method as claimed in claim 6, wherein calculating the depth map includes calculating the element depth for each of the grid elements using the formula:

element depth=$f-y/a$ where y is the iteration number difference, a is a matching curve difference slope, and f is the current lens focus position.

11. An image processing system comprising:

a non-transitory memory configured for storing:

a receive images module for receiving a first image having a first aperture and a second image having a second aperture with the first image and the second image each having a red channel and a green channel;

a calculate blur difference module, coupled to the receive images module, for calculating a red iteration count of a blur difference for the red channel of corresponding portions of the first image and the second image, and calculating a green iteration count of the blur difference for the green channel of corresponding portions of the first image and the second image;

a calculate depth map module, coupled to the calculate blur difference module, for forming a depth map having an element depth based on the red iteration count and the green iteration count; and a calculate display image module, coupled to the calculate depth map module, for forming a display image based on the first image and the depth map for displaying on a display device; and a processor configured for processing the receive image module, the calculate blur difference module, the calculate depth map module and the calculate display image module.

12. The system as claimed in claim 11, further comprising a calculate depth from defocus model table module for calculating a calibration depth for the blur difference between the red channel and the green channel of a first calibration image and a second calibration image for an aperture calibration pair.

13. The system as claimed in claim 11, wherein the receive images module is for receiving the first image with a lens having an aperture diameter set to the first aperture, and for receiving the second image with the lens having the aperture diameter set to the second aperture.

14. The system as claimed in claim 11, wherein the calculate blur difference module is for calculating the blur difference between the red channel of the first image and the second image by iteratively convoluting the red channel of the second image with a blur kernel until a blur metric of the second image is within a blur difference threshold of the blur metric of the first image, and for assigning the red iteration count the value of the number of convolutions needed to bring the blur metric of the second image within the blur difference threshold of the blur metric of the first image.

15. The system as claimed in claim 11, wherein the calculate depth map module is for calculating the element depth using the formula:

$$\text{element depth} = \begin{cases} f + \frac{1}{2}\left(\sqrt{\frac{I_r}{c}} + \sqrt{\frac{I_g}{c}}\right) & \text{if } I_r < I_g \\ f & \text{if } I_r = I_g \\ f - \frac{1}{2}\left(\sqrt{\frac{I_r}{c}} + \sqrt{\frac{I_g}{c}}\right) & \text{if } I_r > I_g \end{cases}$$

where Ir is the red iteration count, is the green iteration count, c is a constant, and f is the current lens focus position.

16. The system as claimed in claim 11, wherein:

the receive images module is for partitioning the first image and the second image into a grid array having grid elements with each of the grid elements of the first image having a corresponding one of the grid elements in the second image;

the calculate blur difference module is for calculating the red iteration count for the red channel of one of the grid elements of the first image and the corresponding one of the grid elements of the second image; and the calculate blur difference module is for calculating the green iteration count for the green channel of one of the grid elements of the first image and the corresponding one of the grid elements of the second image, and calculating a iteration number difference between the red iteration count and the green iteration count.

17. The system as claimed in claim 16, wherein a calculate depth from defocus model table module is for calculating the iteration number difference at a calibration depth for the blur difference between the red channel and the green channel for one of the grid elements of a first calibration image and a second calibration image for an aperture calibration pair.

18. The system as claimed in claim 16, wherein the receive images module is for receiving the first image with a lens having an aperture diameter set to the first aperture and for receiving the second image with the lens having the aperture diameter set to the second aperture.

19. The system as claimed in claim 16, wherein the calculate blur difference module is for calculating the blur difference between the red channel of one of the grid elements of the first image and the red channel of the grid elements of the second image by iteratively convoluting the red channel of one of the grid elements of the second image with a blur kernel until a blur metric of one of the grid elements of the second image is within a blur difference threshold of the blur metric one of the grid elements of the first image and for assigning the red iteration count the value of the number of convolutions needed to bring the blur metric of the second image within the blur difference threshold of the blur metric of the first image.

20. The system as claimed in claim 16, wherein the calculate depth map module is for calculating the element depth for each of the grid elements using the formula:

element depth=$f-y/a$ where y is the iteration number difference, a is a matching curve difference slope, and f is the current lens focus position.

* * * * *